United States Patent
Ohashi et al.

(10) Patent No.: US 9,118,088 B2
(45) Date of Patent: Aug. 25, 2015

(54) ELECTROLYTE SOLUTION AND LITHIUM ION SECONDARY BATTERY USING THE SAME

(75) Inventors: Asami Ohashi, Tokyo (JP); Yoshiyuki Ishii, Tokyo (JP)

(73) Assignee: ASAHI KASEI E-MATERIALS CORPORATION, Tokyo (JP)

( * ) Notice: Subject to any disclaimer, the term of this patent is extended or adjusted under 35 U.S.C. 154(b) by 804 days.

(21) Appl. No.: 13/376,886

(22) PCT Filed: Jun. 9, 2010

(86) PCT No.: PCT/JP2010/059765
§ 371 (c)(1),
(2), (4) Date: Feb. 15, 2012

(87) PCT Pub. No.: WO2010/143658
PCT Pub. Date: Dec. 16, 2010

(65) Prior Publication Data
US 2012/0141878 A1    Jun. 7, 2012

(30) Foreign Application Priority Data
Jun. 10, 2009  (JP) .................................. 2009-139046

(51) Int. Cl.
*H01M 10/0565* (2010.01)
*H01M 10/0567* (2010.01)
(Continued)

(52) U.S. Cl.
CPC ...... *H01M 10/0525* (2013.01); *H01M 10/0565* (2013.01); *H01M 10/0567* (2013.01); *H01M 10/4235* (2013.01); *H01M 10/0569* (2013.01);
(Continued)

(58) Field of Classification Search
CPC .................... H01M 10/0567; H01M 10/0568; H01M 10/0569; H01M 10/0525; H01M 10/4235; H01M 2300/0025; H01M 10/0565; Y20E 60/122
USPC .................................................. 429/300, 339
See application file for complete search history.

(56) References Cited

U.S. PATENT DOCUMENTS

| | | | |
|---|---|---|---|
| 5,120,876 A | 6/1992 | Cheng et al. | |
| 5,480,568 A | 1/1996 | Pawloski et al. | |

(Continued)

FOREIGN PATENT DOCUMENTS

| | | |
|---|---|---|
| CN | 1263882 | 8/2000 |
| CN | 1543005 A | 11/2004 |

(Continued)

OTHER PUBLICATIONS

Machine translation of JP 2008273893A, Fujinami et al., Nov. 2008, Japan.*

(Continued)

*Primary Examiner* — Miriam Stagg
*Assistant Examiner* — Brent Thomas
(74) *Attorney, Agent, or Firm* — Greenblum & Bernstein, P.L.C.

(57) ABSTRACT

The present invention provides an electrolyte solution and a lithium ion secondary battery which maintain for a long period high battery characteristics represented by the discharge capacity retention rate after the charge/discharge cycle, and simultaneously achieve also the high safety represented by the flame retardation. The present invention provides an electrolyte solution containing a nonaqueous solvent, an electrolyte, a specific compound having a perfluoroalkyl group in the molecule, and an additive having a fluorine atom and/or a phosphorus atom in the molecule.

21 Claims, 1 Drawing Sheet

(51) Int. Cl.
  *H01M 10/0525* (2010.01)
  *H01M 10/42* (2006.01)
  *H01M 10/0569* (2010.01)
(52) U.S. Cl.
  CPC ...... *H01M 2300/0025* (2013.01); *Y02E 60/122* (2013.01)

(56) References Cited

U.S. PATENT DOCUMENTS

| | | | |
|---|---|---|---|
| 5,795,677 | A | 8/1998 | Yamamoto et al. |
| 6,002,048 | A | 12/1999 | Fujii et al. |
| 6,242,654 | B1 | 6/2001 | Goto et al. |
| 2002/0028389 | A1* | 3/2002 | Sonoda et al. ............ 429/324 |
| 2004/0214091 | A1 | 10/2004 | Lim et al. |
| 2006/0286308 | A1 | 12/2006 | Kirsch et al. |
| 2006/0292452 | A1 | 12/2006 | Utsugi et al. |
| 2007/0141461 | A1* | 6/2007 | Lin et al. ............ 429/189 |
| 2009/0087740 | A1* | 4/2009 | Deguchi et al. ............ 429/200 |
| 2009/0090891 | A1 | 4/2009 | Okamoto et al. |
| 2010/0035147 | A1 | 2/2010 | Kotato et al. |
| 2011/0008681 | A1 | 1/2011 | Koh et al. |
| 2012/0009480 | A1 | 1/2012 | Ohashi et al. |
| 2012/0177988 | A1 | 7/2012 | Fujii et al. |
| 2012/0184779 | A1 | 7/2012 | Okamoto et al. |

FOREIGN PATENT DOCUMENTS

| | | |
|---|---|---|
| CN | 101432923 A | 5/2009 |
| CN | 101445515 A | 6/2009 |
| EP | 0938151 A2 | 8/1999 |
| EP | 1463143 A2 | 9/2004 |
| EP | 2 221 1295 | 8/2010 |
| JP | 8-37024 | 2/1996 |
| JP | 8-231942 | 9/1996 |
| JP | 8-321313 | 12/1996 |
| JP | 9-97627 | 4/1997 |
| JP | 11-26015 | 1/1999 |
| JP | 2000-294281 | 10/2000 |
| JP | 2001-52737 | 2/2001 |
| JP | 2002-324578 | 11/2002 |
| JP | 2003-168480 A | 6/2003 |
| JP | 2003-323814 | 11/2003 |
| JP | 2005-190869 A | 7/2005 |
| JP | 2006-073513 A | 3/2006 |
| JP | 2007-191626 | 8/2007 |
| JP | 2007-191627 | 8/2007 |
| JP | 2007-191661 | 8/2007 |
| JP | 2007-323827 | 12/2007 |
| JP | 2008-159496 | 7/2008 |
| JP | 2008-198409 A | 8/2008 |
| JP | 2008-218387 | 9/2008 |
| JP | 2008-269982 A | 11/2008 |
| JP | 2008-273893 | 11/2008 |
| JP | 2008273893 A * | 11/2008 |
| JP | 2008-305574 | 12/2008 |
| JP | 2008-305770 A | 12/2008 |
| JP | 2009-87648 | 4/2009 |
| JP | 2010-280799 | 12/2010 |
| JP | 2010-282728 | 12/2010 |
| WO | 91/08198 | 6/1991 |
| WO | 95/27692 | 10/1995 |
| WO | 99/19932 A1 | 4/1999 |
| WO | 2005/019378 | 3/2005 |
| WO | 2005-096411 A2 | 10/2005 |
| WO | 2006-017533 | 2/2006 |
| WO | 2006/078866 A2 | 7/2006 |
| WO | 2007/007636 | 1/2007 |
| WO | 2007/083843 | 7/2007 |
| WO | 2008-123038 A1 | 10/2008 |
| WO | 2009-035085 A1 | 3/2009 |
| WO | 2009-042958 A1 | 4/2009 |
| WO | 2009/078268 | 6/2009 |
| WO | 2010/095572 | 8/2010 |
| WO | 2010/143658 | 12/2010 |
| WO | 2011/099572 | 8/2011 |

OTHER PUBLICATIONS

Chinese Office Action issued with respest to Chinese Application No. 201080023653.1, mail date is Oct. 11, 2013.
Japanese Office Action issued with respect to Japanese Application No. 2010-029382, mail date is Oct. 25, 2013.
"Extended Abstracts of the 49th Battery Symposium in Japan", 2008, pp. 258-260.
Search report from International Application No. PCT/JP2010/059765, mail date is Aug. 24, 2010.
European Search Report issued with respect to European Application No. 10743699.0, mail date is Mar. 3, 2014.
Chinese Office Action issued with respect to Chinese Application No. 201080023653.1, mail date is Mar. 19, 2014.
Napoli et al., "Synthesis of $F(CF_2)_8(CH_2)_8H$ and Gel Phase Formation from its Solutions in Homologous Alcohols", Journal of Fluorine Chemistry, vol. 110, (2001). Elsevier Science, Apr. 28, 2001, pp. 47-58.
"Function Creation and Applications of Ionic Liquid ", NTS, Inc. (2004).
"Separation/Recovery and Storage/Isolation Technologies of $CO_2$", NTS, Inc. (2009).
Miller et al., "Substituted Azole Derivatives as Nonlinear Optical Chromophores", Chem. Mater, vol. 6, No. 7, (1994). IBM Research Division, Almaden Research Center, San Jose California., Apr. 25, 1994, pp. 1023-1032.
Kazunori Hirabayashi et al., "A New Transformation of Silanols, Palladium-Catalyzed Cross-Coupling with Organic Halides in the Presence of Silver(I) Oxide.", Organic Letters, vol. 1, No. 2, (1999). Research Laboratory of Resources Utilization, Tokyo Institute of Technology., Apr. 22, 1999, pp. 299-301.
Search report from International Application No. PCT/JP2010/052090, mail date is May 18, 2010.
Search report from International Application No. PC/JP2011/052908, mail date is Apr. 5, 2011.
International Preliminary Report on Patentability for PCT/JP2010/052090, mailed Sep. 13, 2011.
Notice of Allowance issued with respect to U.S. Appl. No. 13/205,096 mailed on Oct. 3, 2012.
China Office action, mail date is May 6, 2013.
International Preliminary Report on Patentability and Written Opinion for International Application No. PCT/JP2010/059765, mail date is Jan. 26, 2012.
European Search Report issued with respect to counterpart European Application No. 111742315.2, dated Mar. 18, 2013.
Cheng et al., "Quadratic hyperpolarizabilities of fluorinated sulfonyl and carbonyl aromatics: optimization of nonlinearity and transparency trade-off", Proceedings of SPIE, vol. 1337, 1990, pp. 203-214 XP055053380.
Tam et al., "Donor- and acceptor-substituted organic and organometallic compounds. Second-order nonlinear optical properties", ACS Symposium Series, 455 (Mater. Nonlinear Opt.) pp. 158-169, XP002692142, Database CA [Online] Chemical Abstracts Service, Columbus Ohio, US.
Supplementary European Search Report issued with respect to application No. 10786189.0, mail date is Dec. 22, 2014.
Supplemental European Search report issued with respect to application No. 10786189.0 mail date is Apr. 22, 2015.

* cited by examiner

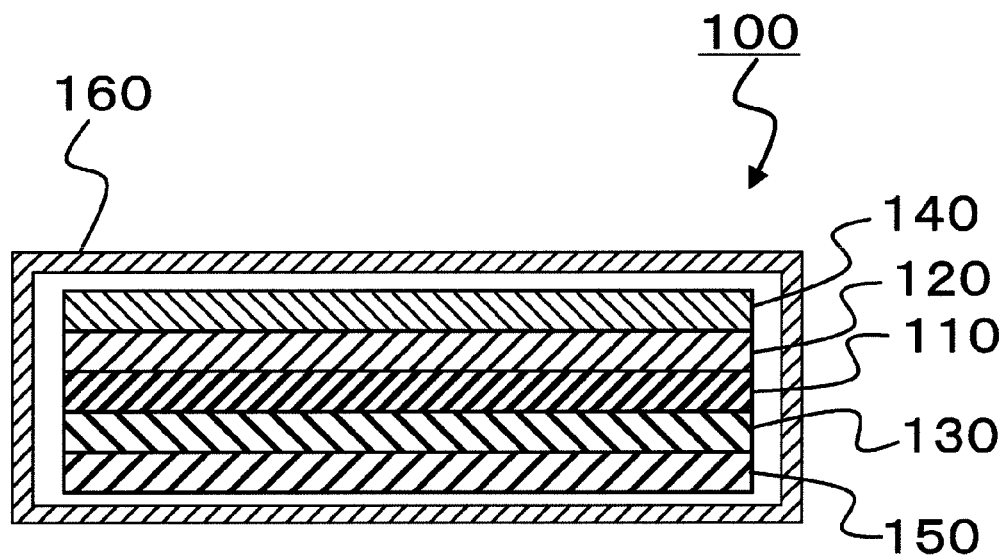

ELECTROLYTE SOLUTION AND LITHIUM ION SECONDARY BATTERY USING THE SAME

TECHNICAL FIELD

The present invention relates to an electrolyte solution suitable for an electrochemical device, and a lithium ion secondary battery.

BACKGROUND ART

Along with recent year's expansion of electronic technologies and growing concern in environmental technologies, various types of electrochemical devices have been used. Particularly, there are many demands for energy saving, and expectations for things capable of contributing to the demands increasingly become high. The things include, for example, solar batteries as power generation devices, and secondary batteries and capacitors as power storage devices. Lithium ion secondary batteries as a representative example of power storage devices have been originally used mainly as rechargeable batteries for portable devices, but in recent years, they have been expected to be used as batteries for hybrid cars and electric cars.

Now then, these electrochemical devices are used over a long period of several years to several tens of years, and demanded to exhibit a high efficiency and a low cost, and additionally, an elongated life (high durability) and high safety as well. However, since materials constituting these electrochemical devices include also materials easily combustible and materials easily deteriorating, there remains a problem in achievement of elongated life and high safety.

Lithium ion secondary batteries representative as power storage devices usually have a constitution in which a positive electrode and a negative electrode constituted mainly of active substances capable of doping and dedoping lithium are disposed across a separator. In the lithium ion secondary batteries, the positive electrode is formed by coating a positive electrode mixture obtained by mixing $LiCoO_2$, $LiNiO_2$, $LiMn_2O_4$ and the like as positive electrode active substances, carbon black, graphite and the like as conductive agents, and polyvinylidene fluoride, a latex, rubber and the like as binders, on a positive electrode current collector composed of aluminum or the like. The negative electrode is formed by coating a negative electrode mixture obtained by mixing coke, graphite and the like as negative electrode active substances, and polyvinylidene fluoride, a latex, rubber and the like as binders, on a negative electrode current collector composed of copper or the like. The separator is formed of a porous polyolefin or the like, and has a thickness as very thin as several micrometers to several hundred micrometers. The positive electrode, the negative electrode and the separator are immersed in an electrolyte solution in the battery. Examples of the electrolyte solution include electrolyte solutions in which a lithium salt such as $LiPF_6$ and $LiBF_4$ is dissolved in an aprotic solvent such as propylene carbonate and ethylene carbonate, or a polymer such as polyethylene oxide.

Lithium ion secondary batteries are presently used mainly as rechargeable batteries of portable devices (see, for example, Patent Literature 1). However, an organic solvent-based electrolyte solution is used in the lithium ion secondary batteries, so there arises a large problem of further improvement of the safety. For the improvement of the safety, batteries have been developed including batteries using an ionic liquid (see, for example, Patent Literatures 2 and 3) as an electrolyte solution, a polymer battery and a gel battery (see, for example, Patent Literatures 4 and 5), a battery in which an additive for improving safety is added to an electrolyte solution (Patent Literature 6), and a battery using a fluorosolvent as an electrolyte solution (see, for example, Non Patent Literature 1).

CITATION LIST

Patent Literature

Patent Literature 1: Japanese Patent Application Laid-Open No. 2009-087648
Patent Literature 2: Japanese Patent Application Laid-Open No. 2008-305574
Patent Literature 3: Japanese Patent Application Laid-Open No. 2007-323827
Patent Literature 4: Japanese Patent Application Laid-Open No. 2008-159496
Patent Literature 5: WO 2007/083843
Patent Literature 6: Japanese Patent Application Laid-Open No. 8-321313

Non Patent Literature

Non Patent Literature 1: Extended Abstracts of the 49th Battery Symposium in Japan, pp. 258-260 (2008)

SUMMARY OF INVENTION

Technical Problem

However, at present, it is the actual situation that the safety and the battery characteristics have a tradeoff relationship, and it is difficult to simultaneously satisfy both the good safety and battery characteristics (charge/discharge characteristics, low-temperature operability, high-temperature durability and the like).

Then, the present invention has been achieved in consideration of the above-mentioned situations, and has an object to provide an electrolyte solution and a lithium ion secondary battery which maintain for a long period high battery characteristics represented by the discharge capacity retention rate after the charge/discharge cycle, and simultaneously achieve also the high safety represented by the flame retardation.

Solution to Problem

As a result of studies on various types of additives in order to achieve the above-mentioned object, the present inventors have found that the use of an electrolyte solution containing a specific perfluoro group-containing compound and an additive having a fluorine atom and/or a phosphorus atom in the molecule enables to form a battery simultaneously satisfying both the high battery characteristics and the high safety, and this finding has led to the completion of the present invention.

That is, the present invention is as follows.

[1] An electrolyte solution comprising a nonaqueous solvent, an electrolyte, a compound represented by the general formula (1) and/or (2) shown below, and an additive having a fluorine atom and/or a phosphorus atom in the molecule:

(1)

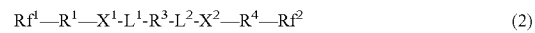
(2)

wherein in the formula (1) and the formula (2), each of $Rf^1$ and $Rf^2$ independently represents a perfluoroalkyl group having 2 to 20 carbon atoms; each of $R^1$ and $R^4$ independently represents a single bond or a divalent saturated hydrocarbon group having 1 to 6 carbon atoms; each of $X^1$ and $X^2$ independently represents a divalent functional group selected from the group consisting of an ether group, a sulfide group, a sulfoxide group, a sulfone group, an ester group, a divalent amido group and a divalent urethane group; each of $L^1$ and $L^2$ independently represents a single bond, an oxyalkylene group which may be substituted with an alkyl group or a halogen atom, an oxycycloalkylene group which may be substituted with an alkyl group or a halogen atom, or a divalent oxyaromatic group which may be substituted with an alkyl group or a halogen atom; $R^2$ represents an alkyl group having 1 to 20 carbon atoms which may be substituted with an alkyl group or a halogen atom (excluding a fluorine atom), a fluoroalkyl group which may be substituted with an alkyl group or a halogen atom (excluding a fluorine atom), an aryl group or a fluoroaryl group, or a monovalent group in which one or more of the alkyl, fluoroalkyl, aryl and fluoroaryl groups are bonded with one or more of divalent groups corresponding to the alkyl, fluoroalkyl, aryl, or fluoroaryl groups; and $R^3$ represents a divalent saturated hydrocarbon group having 1 to 18 carbon atoms which may have one or more oxygen and/or sulfur atoms on the main chain and which may be substituted with an alkyl group.

[2] The electrolyte solution according to [1], wherein each of the $Rf^1$ and the $Rf^2$ is independently a perfluoroalkyl group having 2 to 12 carbon atoms.

[3] The electrolyte solution according to [1] or [2], wherein each of the $L^1$ and the $L^2$ is independently a divalent oxyaromatic group.

[4] The electrolyte solution according to any one of [1] to [3], wherein each of the $X^1$ and the $X^2$ is independently a sulfone group or an ether group.

[5] The electrolyte solution according to any one of [1] to [4], wherein the $X^1$ and the $X^2$ are a sulfone group.

[6] The electrolyte solution according to any one of [1] to [5], wherein the additive having a fluorine atom and/or a phosphorus atom in the molecule is one or more selected from the group consisting of phosphoric acid compounds, reducing phosphorus compounds, fluorine-substituted alkyl ethers, fluorine-containing amides, fluorine-substituted hydrocarbons, fluorine-containing esters, fluorine-containing carbonates, fluorine-containing phosphate (phosphite) esters, fluorine-containing phosphate (phosphite) salts, fluorine-containing polymers and phosphazene compounds.

[7] The electrolyte solution according to any one of [1] to [6], wherein the additive having a fluorine atom and/or a phosphorus atom in the molecule is an additive having an amount of fluorine atoms satisfying the condition represented by the following expression (18):

$$(N_F)/(N_F+N_H) \geq 0.5 \qquad (18)$$

wherein $N_F$ indicates the number of fluorine atoms per molecule of the additive having a fluorine atom and/or a phosphorus atom in the molecule; and $N_H$ indicates the number of hydrogen atoms per molecule of the additive having a fluorine atom and/or a phosphorus atom in the molecule.

[8] The electrolyte solution according to any one of [1] to [7], wherein the additive having a fluorine atom and/or a phosphorus atom in the molecule is one or more selected from the group consisting of reducing phosphorus compounds, fluorine-substituted alkyl ethers, fluorine-containing amides and phosphazene compounds.

[9] The electrolyte solution according to any one of [1] to [8], wherein the additive having a fluorine atom and/or a phosphorus atom in the molecule is a reducing phosphorus compound.

[10] The electrolyte solution according to any one of [1] to [9], wherein the additive having a fluorine atom and/or a phosphorus atom in the molecule is a compound having a fluorine atom and a phosphorus atom in the molecule.

[11] The electrolyte solution according to any one of [1] to [10], wherein the electrolyte is a lithium salt.

[12] The electrolyte solution according to any one of [1] to [11], wherein the electrolyte solution is a gelatinized electrolyte solution.

[13] A lithium ion secondary battery comprising: an electrolyte solution according to any one of [1] to [12]; a positive electrode comprising one or more materials selected from the group consisting of materials capable of doping and dedoping lithium ions, as a positive electrode active substance; and a negative electrode comprising one or more materials selected from the group consisting of materials capable of doping and dedoping lithium ions and metallic lithium, as a negative electrode active substance.

[14] The lithium ion secondary battery according to [13], wherein the positive electrode comprises a lithium-containing compound as the positive electrode active substance.

[15] The lithium ion secondary battery according to [13] or [14], wherein the negative electrode comprises one or more materials selected from the group consisting of metallic lithium, carbon materials, materials containing an element capable of forming an alloy with lithium, and lithium-containing compounds, as the negative electrode active substance.

Advantageous Effects of Invention

The present invention can provide an electrolyte solution and a lithium ion secondary battery which maintain for a long period high battery characteristics represented by the discharge capacity retention rate after the charge/discharge cycle, and simultaneously actualize also the high safety represented by the flame retardation.

BRIEF DESCRIPTION OF DRAWING

FIG. 1 is a sectional view schematically illustrating one example of the lithium ion secondary battery according to the present embodiment.

DESCRIPTION OF EMBODIMENT

Hereinafter, the embodiment according to the present invention (hereinafter, referred to simply as "the present embodiment") will be described in detail. The electrolyte solution according to the present embodiment comprises a nonaqueous solvent, an electrolyte, a compound having a perfluoro group represented by the general formula (1) and/or (2) shown above (hereinafter, also referred to as "perfluoro compound"), and an additive having a fluorine atom and/or a phosphorus atom in the molecule. The lithium ion secondary battery according to the present embodiment comprises the electrolyte solution, a positive electrode comprising one or more materials selected from the group consisting of materials capable of doping and dedoping lithium ions, as a positive electrode active substance, and a negative electrode comprising one or more materials selected from the group consisting of materials capable of doping and dedoping lithium ions and metallic lithium, as a negative electrode active substance. The compound represented by the general formula (2) described above may be a dimer structure of the compound represented by the general formula (1) described above.

<Electrolyte Solution>

The electrolyte solution according to the present embodiment comprises (I) a nonaqueous solvent, (II) an electrolyte, (III) a perfluoro compound, and (IV) an additive having a fluorine atom and/or a phosphorus atom.

(I) Various nonaqueous solvents may be used, and examples thereof include aprotic solvents. An aprotic polar solvent is preferable when the electrolyte solution is used for a lithium ion secondary battery and a lithium ion capacitor. Specific examples thereof include cyclic carbonates typically represented by ethylene carbonate, propylene carbonate, 1,2-butylene carbonate, trans-2,3-butylene carbonate, cis-2,3-butylene carbonate, 1,2-pentylene carbonate, trans-2,3-pentylene carbonate, cis-2,3-pentylene carbonate, trifluoromethyl ethylene carbonate, fluoroethylene carbonate and 4,5-difluoroethylene carbonate; lactones typically represented by γ-butyrolactone and γ-valerolactone; cyclic sulfones typically represented by sulfolane; cyclic ethers typically represented by tetrahydrofuran and dioxane; chain carbonates typically represented by methyl ethyl carbonate, dimethyl carbonate, diethyl carbonate, methyl propyl carbonate, methyl isopropyl carbonate, dipropyl carbonate, methyl butyl carbonate, dibutyl carbonate, ethyl propyl carbonate and methyl trifluoroethyl carbonate; nitriles typically represented by acetonitrile; chain ethers typically represented by dimethyl ether; chain carboxylate esters typically represented by methyl propionate; and chain ether carbonate compounds typically represented by dimethoxyethane. These are used singly or in combination of two or more.

In the case where the electrolyte solution is used as an electrolyte solution for dye-sensitized solar batteries, examples of the nonaqueous solvent include alcohols, ethers, esters, carbonate esters, lactones, carboxylate esters, phosphate triesters, heterocyclic compounds, nitriles, ketones, amides, nitromethane, halogenated hydrocarbons, dimethyl sulfoxide, sulfolane, N-methylpyrrolidone, 1,3-dimethylimidazolidinone, 3-methyloxazolidinone and hydrocarbons. These may be used singly or in combination of two or more.

In the case where the electrolyte solution is used as an electrolyte solution for electric double-layer capacitors, examples of the nonaqueous solvent include organic solvents containing γ-butyrolactone. Examples of a solvent mixed with γ-butyrolactone include carbonates such as propylene carbonate, ethylene carbonate, butylene carbonate, dimethyl carbonate and diethyl carbonate; ethers such as trimethoxymethane, 1,2-dimethoxyethane, diethyl ether, 2-ethoxyethane, tetrahydrofuran and 2-methyltetrahydrofuran; sulfoxides such as dimethyl sulfoxide; oxolanes such as 1,3-dioxolane and 4-methyl-1,3-dioxolane; nitrogen-containing compounds such as acetonitrile and nitromethane; organic acid esters such as methyl formate, methyl acetate, ethyl acetate, butyl acetate, methyl propionate and ethyl propionate; inorganic acid esters such as phosphate triesters, and carbonate diesters including dimethyl carbonate, diethyl carbonate and dipropyl carbonate; diglymes; triglymes; sulfones such as sulfolane, 3-methyl sulfolane and 2,4-dimethyl sulfolane; oxazolidinones such as 3-methyl-2-oxazolidinone; and sultones such as 1,3-propane sultone, 1,4-butane sultone and naphthasultone. These may be used singly or in combination of two or more.

In the case where the electrolyte solution is used as an electrolyte solution for aluminum electrolytic capacitors, examples of the nonaqueous solvent include mixed solutions using solvents such as γ-butyrolactone, ethylene glycol and the like.

Particularly, when the electrolyte solution is used for a lithium ion secondary battery and a lithium ion capacitor, in order to raise the degree of ionization of a lithium salt which is an electrolyte contributing to charge/discharge of the lithium ion secondary battery and the lithium ion capacitor, the nonaqueous solvent preferably contains one or more cyclic aprotic polar solvents. From the similar viewpoint, the nonaqueous solvent preferably contains one or more cyclic carbonates represented by ethylene carbonates and propylene carbonates. The cyclic compounds have a high permittivity, and assist the electrolytic dissociation of lithium salts and also enhance the gelling power.

As the nonaqueous solvent, an ionic liquid can be used. The ionic liquid refers to a liquid composed only of ions in combination of organic cations and anions.

The organic cations include imidazolium ions such as dialkyl imidazolium cations and trialkyl imidazolium cations, tetraalkyl ammonium ions, alkyl pyridinium ions, dialkyl pyrrolidinium ions and dialkyl piperidinium ions.

Examples of the anions usable as counters of these organic cations are $PF_6$ anions, $PF_3(C_2F_5)_3$ anions, $PF_3(CF_3)_3$ anions, $BF_4$ anions, $BF_2(CF_3)_2$ anions, $BF_3(CF_3)$ anions, bisoxalatoborate anions, Tf (trifluoromethanesulfonyl) anions, Nf (nonafluorobutanesulfonyl) anions, bis(fluorosulfonyl)imide anions, bis(trifluoromethanesulfonyl)imide anions, bis(pentafluoroethanesulfonyl)imide anions and dicyanoamine anions.

The ionic liquid is useful particularly in lithium ion secondary batteries, lithium ion capacitors, dye-sensitized solar batteries and the like.

(II) The electrolyte is not especially limited as long as being one used as a usual nonaqueous electrolyte in an electrolyte solution, and any one may be used. In the case where an electrolyte solution is used in lithium ion secondary batteries and lithium ion capacitors, lithium salts are used as electrolytes. Specific examples of the lithium salt include $LiPF_6$, $LiBF_4$, $LiClO_4$, $LiAsF_6$, $Li_2SiF_6$, and $LiOSO_2C_kF_{2k+1}$ [k is an integer of 1 to 8], $LiN(SO_2C_kF_{2k+1})_2$ [k is an integer of 1 to 8], $LiPF_n(C_kF_{2k+1})_{6-n}$, [n is an integer of 1 to 5, and k is an integer of 1 to 8], $LiBF_n(C_kF_{2k+1})_{4-n}$ [n is an integer of 1 to 3, and k is an integer of 1 to 8], lithium bisoxalatoborate represented by $LiB(C_2O_2)_2$, lithium difluorooxalylborate represented by $LiBF_2(C_2O_2)$, and lithium trifluorooxalylphosphate represented by $LiPF_3(C_2O_2)$.

Lithium salts represented by the general formulae (3a), (3b) and (3c) shown below may be used as electrolytes as well.

$$LiC(SO_2R^{11})(SO_2R^{12})(SO_2R^{13}) \tag{3a}$$

$$LiN(SO_2OR^{14})(SO_2OR^{15}) \tag{3b}$$

$$LiN(SO_2R^{16})(SO_2OR^{17}) \tag{3c}$$

wherein $R^{11}$, $R^{12}$, $R^{13}$, $R^{14}$, $R^{15}$, $R^{16}$ and $R^{17}$ may be identical or different from each other, and represent a perfluoroalkyl group having 1 to 8 carbon atoms.

These electrolytes are used singly or in combination of two or more. For use in a lithium ion secondary battery and a lithium ion capacitor, among these electrolytes, especially $LiPF_6$, $LiBF_4$, and $LiN(SO_2C_kF_{2k+1})_2$ [k is an integer of 1 to 8] are preferable from the viewpoint of increasing the gelling power in addition to the battery characteristics and stability.

In the case where the electrolyte solution is used in dye-sensitized solar batteries, examples of the electrolyte include a combination of iodine ($I_2$) and a metal iodide or an organic iodide, and a combination of bromine ($Br_2$) and a metal bromide or an organic bromide.

In the case where the electrolyte solution is used in electric double-layer capacitors, examples of the electrolyte include salts of cations such as metal cations, quaternary ammonium cations and carbonium cations with anions selected from the group consisting of $BF_4^-$, $PF_6^-$, $ClO_4^-$, $AsF_6^-$, $SbF_6^-$, $AlCl_4^-$, $RfSO_3^-$, $(RfSO_2)_2N^-$ and $RfCO_2^-$ (in this paragraph, Rf represents a fluoroalkyl group having carbon 1 to 8 atoms). These may be used singly or in combination of two or more.

In the case where the electrolyte solution is used for aluminum electrolytic capacitors, examples of the electrolyte include carboxylic acid ammonium salts, tertiary amine salts and quaternary amine salts.

The concentration of an electrolyte is optional and is not especially limited, but the electrolyte is contained in a concentration of preferably 0.1 to 3 mol/L, and more preferably 0.5 to 2 mol/L, in an electrolyte solution.

(III) The perfluoro compound is represented by the general formulae (1) and/or (2) shown above. Making the electrolyte solution according to the present embodiment contain the perfluoro compound achieves an effect of suppressing the deterioration of batteries and an effect of suppressing the combustion thereof.

In the general formulae (1) and (2) shown above, each of $Rf^1$ and $Rf^2$ independently represents a perfluoroalkyl group having 2 to 20 carbon atoms. The number of carbon atoms from 2 to 20 makes it easy to obtain the raw material and synthesize the perfluoro compound. The number of carbon atoms is preferably 2 to 12 from the viewpoint of the mixability of the perfluoro compound in the electrolyte solution, the electrochemical characteristics of the electrolyte solution and the gelling power. Examples of the perfluoroalkyl group include a perfluoroethyl group, a perfluoro-n-propyl group, a perfluoroisopropyl group, a perfluoro-n-butyl group, a perfluoro-t-butyl group, a perfluoro-n-hexyl group, a perfluoro-n-octyl group, a perfluoro-n-decyl group and a perfluoro-n-dodecyl group.

In the general formulae (1) and (2) shown above, each of $R^1$ and $R^4$ independently represents a single bond or a divalent saturated hydrocarbon group having 1 to 6 carbon atoms, and the number of carbon atoms is preferably 2 to 5. In the case where the number of carbon atoms of the divalent saturated hydrocarbon group is 3 or more, the hydrocarbon group may be branched or not branched. Examples of such a divalent saturated hydrocarbon group include a methylidene group, an ethylene group, an n-propylene group, an isopropylene group and an n-butene group.

Each of $X^1$ and $X^2$ independently represents a divalent functional group selected from the group consisting of an ether group (—O—), a sulfide group (—S—), a sulfoxide group (—SO—), a sulfone group (—$SO_2$—, also referred to as a sulfonyl group), an ester group (—$CO_2$—), a divalent amido group (—NHCO—) and a divalent urethane group (—$NHCO_2$—). Among these, from the electrochemical viewpoint, a divalent functional group selected from the group consisting of an ether group, a sulfide group and a sulfone group is preferable; a sulfone group or an ether group is more preferable; and a sulfone group is still more preferable.

Each of $L^1$ and $L^2$ independently represents a single bond, an oxyalkylene group which may be substituted with an alkyl group or a halogen atom (that is, which may not be substituted), an oxycycloalkylene group which may be substituted with an alkyl group or a halogen atom (that is, which may not be substituted), or a divalent oxyaromatic group (—OAr—, Ar is a divalent aromatic group) which may be substituted with an alkyl group or a halogen atom (that is, which may not be substituted). Examples of the oxyalkylene group include oxyalkylene groups having 2 to 10 carbon atoms, and more specifically an oxyethylene group (—$C_2H_4O$—) and an oxypropylene group (—$C_3H_6O$—). Examples of the oxycycloalkylene group include oxycycloalkylene groups having 5 to 12 carbon atoms, and more specifically an oxycyclopentylene group, an oxycyclohexylene group and an oxydicyclohexylene group.

Among these, from the viewpoint of improving the gelling power and the safety of an electrolyte solution, divalent oxyaromatic groups are preferable. A divalent aromatic group in the divalent oxyaromatic groups which may be substituted with an alkyl group or a halogen group is a divalent cyclic group exhibiting the so-called "aromaticity". The divalent aromatic group may be a carbocyclic group or a heterocyclic group. The carbocyclic group has 6 to 30 atoms of the nucleus(es), and may be substituted with an alkyl group or a halogen atom, or may not be substituted as described above. Specific examples thereof include divalent groups having a nucleus(es) typically represented by a phenylene group, a biphenylene group, a terphenylene group, a naphthylene group, an anthranylene group, a phenanthrylene group, a pyrenylene group, a chrysenylene group and a fluoranthenylene group.

The heterocyclic group has 5 to 30 atoms of the nucleus(es), and examples thereof include divalent groups having a nucleus(es) typically represented by a pyrrolene group, a furanylene group, a thiophenylene group, a triazolene group, an oxadiazolene group, a pyridylene group and a pyrimidylene group. Among these divalent aromatic groups, a phenylene group, a biphenylene group or a naphthylene group is preferable. Examples of the alkyl group as the substituent include a methyl group and an ethyl group; and examples of the halogen atom include a fluorine atom, a chlorine atom and a bromine atom.

The oxycycloalkylene group and the oxyaromatic group include the groups to which a plurality of rings are bonded, and examples of such a group include an oxybiphenylene group, an oxyterphenylene group and an oxycycloalkylphenylene group.

$R^2$ in the general formula (1) shown above represents an alkyl group having 1 to 20 carbon atoms which may be substituted with an alkyl group or a halogen atom (excluding a fluorine atom), a fluoroalkyl group which may be substituted with an alkyl group or a halogen atom (excluding a fluorine atom), an aryl group or a fluoroaryl group, or a monovalent group in which one or more of the alkyl, fluoroalkyl, aryl and fluoroaryl groups are bonded with one or more of divalent groups corresponding to the alkyl, fluoroalkyl, aryl, or fluoroaryl groups. $R^2$ more specifically includes alkyl groups having 1 to 12 carbon atoms represented by a methyl group, an ethyl group, an n-propyl group, an n-butyl group, an n-pentyl group, an n-hexyl group, an n-heptyl group, an n-octyl group and an n-decyl group. The alkyl group may be substituted further with an alkyl group or a halogen atom (excluding a fluorine atom), or may not be substituted.

The fluoroalkyl group is preferably a fluoroalkyl group (excluding perfluoroalkyl groups) having 1 to 12 carbon atoms, or a perfluoroalkyl group having 1 to 12 carbon atoms. The fluoroalkyl group (excluding perfluoroalkyl groups) having 1 to 12 carbon atoms and the perfluoroalkyl group having 1 to 12 carbon atoms specifically include a trifluoromethyl group, a 1,1,1,2,2-pentafluoroethyl group, a 1,1,2,2-tetrafluoroethyl group, a 1,1,1,2,2,3,3-heptafluoro-n-butyl group, a 1,1,2,2,3,3,4,4,5,5,6,6-dodecafluoro-n-hexyl group and a 1,1,1,2,2,3,3,4,4,5,5,6,6-tridecafluoro-n-decyl group. The fluoroalkyl group may be substituted further with an alkyl group or a halogen atom (excluding a fluorine atom), or may not be substituted.

Examples of the aryl group include aryl groups having 6 to 12 nucleus atoms represented by a phenyl group, a biphenyl group and a naphthyl group; and examples of the fluoroaryl group include fluoroaryl groups having 6 to 12 nucleus atoms represented by a monofluorophenyl group, a difluorophenyl group and a tetrafluorophenyl group.

$R^2$ may further be a monovalent group in which one or more of the alkyl, fluoroalkyl, aryl and fluoroaryl groups described above are bonded with one or more of divalent groups corresponding to the alkyl, fluoroalkyl, aryl and fluoroaryl groups, that is, an alkylene group, a fluoroalkylene group, an arylene group and a fluoroarylene group. Examples of such a group include a group (which is also one of fluoroalkyl groups) in which an alkylene group and a perfluoroalkyl group are bonded, a group in which an alkylene group and an aryl group are bonded, and a group in which a fluoroalkyl group and a fluoroarylene group are bonded.

$R^2$ is, from the viewpoint of taking the advantage according to the present invention more effectively and securely, preferably an alkyl group or a fluoroalkyl group, more preferably an alkyl group having 1 to 12 carbon atoms, a fluoroalkyl group (excluding perfluoroalkyl groups) having 1 to 12 carbon atoms or a perfluoroalkyl group having 1 to 12 carbon atoms, and still more preferably an alkyl group having 1 to 8 carbon atoms, or a fluoroalkyl group (excluding perfluoroalkyl groups) having 2 to 10 carbon atoms.

In the case where a perfluoro compound acts as a gelling agent, the gelling power thereof can be controlled also by selections of the chain length and the kind of $R^2$.

$R^3$ in the general formula (2) shown above represents a divalent saturated hydrocarbon group having 1 to 18 carbon atoms which may have or may not have one or more oxygen and/or sulfur atoms on the main chain and which may be or may not be substituted with an alkyl group. The number of carbon atoms thereof is preferably 1 to 16, and more preferably 2 to 14. The gelling power can be controlled also by the number of carbon atoms of $R^3$. The number of carbon atoms in the above-mentioned range is preferable from the viewpoint of the synthesis and the availability of the raw material.

Examples of the perfluoro compound include compounds represented by the general formulae: $Rf^1$—$R^1$—O—$R^2$, $Rf^1$—$R^1$—S—$R^2$, $Rf^1$—$R^1$—$SO_2$—$R^2$, $Rf^1$—$R^1$—OCO—$R^2$, $Rf^1$—$R^1$—O—Ar—O—$R^2$ (wherein Ar represents a divalent aromatic group; hereinafter, the same meaning), $Rf^1$—$R^1$—$SO_2$—Ar—O—$R^2$, $Rf^1$—$R^1$—$SO_2$—Ar—O—$Rf^4$, $Rf^1$—$R^1$—$SO_2$—Ar—O—$Rf^3$—$Rf^4$ (wherein $Rf^3$ represents a fluoroalkylene group and $Rf^4$ represents a fluoroalkyl group), $Rf^1$—$R^1$—SO—Ar—O—$R^2$, $Rf^1$—$R^1$—S—Ar—O—$R^2$, $Rf^1$—$R^1$—O—$R^6$—O—$R^2$ (wherein $R^5$ represents an alkylene group), $Rf^1$—$R^1$—CONH—$R^2$, $Rf^1$—$R^1$—$SO_2$—$Ar^1$—O—$R^3$—O—$Ar^2$—$SO_2$—$R^4$—Rf (wherein each of $Ar^1$ and $Ar^2$ independently represents a divalent aromatic group; hereinafter, the same meaning), $Rf^1$—$R^1$—O—$Ar^1$—O—$R^3$—O—$Ar^2$—O—$R^4$—$Rf^2$ and $Rf^1$—$R^1$—$SO_2$—$Ar^1$—O—$R^6$—O—$R^7$—O—$Ar^2$—O—$R^4$—$Rf^2$ (wherein each of $R^6$ and $R^7$ independently represents an alkylene group). The perfluoro compound more specifically includes the compounds represented by the respective general formulae described above in which each of $Rf^1$ and $Rf^2$ is independently a perfluoroalkyl group having 2 to 10 carbon atoms; $R^1$ is an alkylene group having 2 to 4 carbon atoms; Ar is (or each of $Ar^1$ and $Ar^2$ is independently) a p-phenylene group or a p-biphenylene group; and $R^2$ is an alkyl group having 4 to 8 carbon atoms, and dimmer structures thereof, for example, compounds represented by the general formulae:

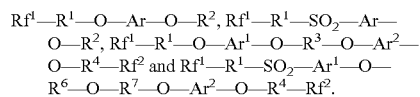

The perfluoro compounds are used singly or in combination of two or more. The perfluoro compound is more preferably one having a gelling power to an electrolyte solution. If an electrolyte solution can be gelatinized with a perfluoro compound, the safety due to non-leakage can be imparted to the electrolyte solution.

The content of a perfluoro compound in the electrolyte solution according to the present embodiment is arbitrary, but the content ratio of a perfluoro compound to a nonaqueous solvent is, in terms of mass, preferably 0.1:99.9 to 10:90, and more preferably 0.3:99.7 to 5:95. When the content ratio of these components is within the above range, a lithium ion secondary battery using the electrolyte solution according to the present embodiment exhibits particularly high battery characteristics. In the case where a perfluoro compound acts as a gelling agent, the content ratio of these components in the above range can provide both good gelling power and handleability. A larger content amount of a perfluoro compound as a gelling agent in an electrolyte solution turns the electrolyte solution to a firmer gel having a higher phase transition point; and a lower content amount thereof makes the electrolyte solution exhibiting a lower viscosity and easier handleability.

The perfluoro compound according to the present embodiment can be produced referring to methods described, for example, in WO 2007/083843, and Japanese Patent Application Laid-Open Nos. 2007-191626, 2007-191627 and 2007-191661.

The perfluoro compound according to the present embodiment can be synthesized, for example, by the following scheme.

That is, a compound represented by the following formula (II) is synthesized from a commercially available compound represented by the following formula (I) as follows.

[Formula 1]

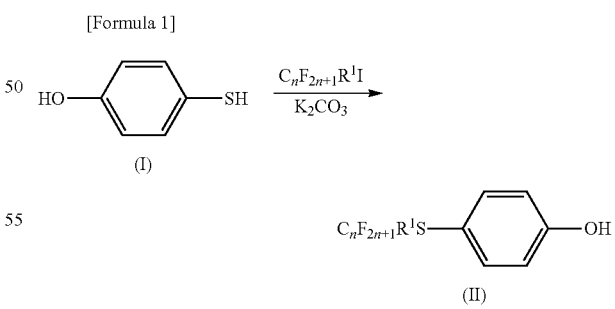

The compound (4-hydroxy-4'-mercaptophenyl) represented by the formula (I) shown above may be replaced by 4-hydroxy-4'-mercaptobiphenyl, but in the following description, an example of using 4-hydroxy-4'-mercaptophenyl will be shown. Then, the compound represented by the formula (I) shown above is dimerized as follows to obtain a compound represented by the formula (III).

[Formula 2]

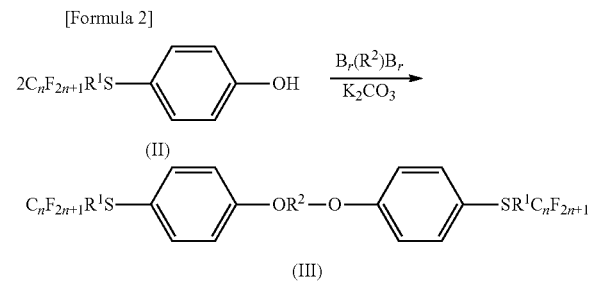

In this case, as the compounds represented by the formula (II), ones having mutually different numbers of carbon atoms of the perfluoroalkyl groups may be used (for example, n in one of the compounds is replaced by a different numerical value of m), or $R^1$ may be altered to $R^3$ which is a divalent hydrocarbon group different from $R^1$. However, since both the compounds do not always react statistically in a molar ratio of 1:1, the same compound is preferably used as the compound represented by the formula (II) from the viewpoint of stably obtaining a desired compound.

The compound represented by the formula (III) has a gelling power, but further as shown in the following reaction formula, a perfluoro compound represented by the following formula (IV) is obtained by oxidizing the thioether moiety to sulfonylate or sulfoxidize the moiety.

[Formula 3]

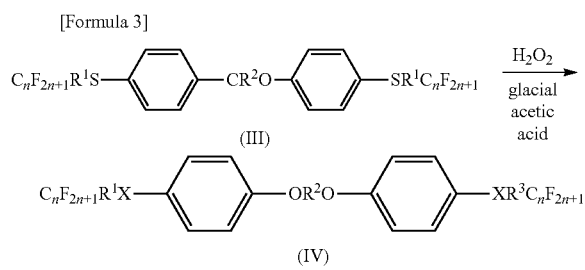

Only in the production scheme of the perfluoro compound represented by the general formula (IV) shown above, n represents an integer of 2 to 18; each of $R^1$ and $R^3$ independently represents a single bond or a substituted or nonsubstituted divalent hydrocarbon group having 1 to 6 carbon atoms of the main chain; $R^2$ represents a substituted or nonsubstituted divalent hydrocarbon group which may have an ether group or a thioether group and which has 3 to 18 carbon atoms of the main chain; and each of X independently represents an SO group or an $SO_2$ group.

Alternatively, the perfluoro compound according to the present embodiment can be synthesized, for example, by the following scheme. First, a thiol compound represented by the following general formula (1a) is sulfidized with a compound represented by the following general formula (1b) in a solvent such as dry THF in the presence of a base such as triethylamine to obtain a compound represented by the following general formula (1c).

$$HS-Ar-OH \quad (1a)$$

$$C_mF_{2m+1}C_pH_{2p}X^1 \quad (1b)$$

$$C_mF_{2m+1}C_pH_{2p}-S-Ar-OH \quad (1c)$$

Then, the compound represented by the general formula (1c) shown above is etherized with a compound represented by the following general formula (1d) in a solvent such as 3-pentanone in the presence of an alkaline metal compound such as $K_2CO_3$ to obtain a compound represented by the following general formula (1e).

$$R^1X^2 \quad (1d)$$

$$C_mF_{2m+1}C_pH_{2p}-S-Ar-O-R^1 \quad (1e)$$

Then, the compound represented by the general formula (1e) shown above is oxidized with an oxidizing agent such as hydrogen peroxide in the presence of a catalyst such as acetic acid to obtain a perfluoro compound represented by the following general formula (1j).

$$C_mF_{2m+1}C_pH_{2p}-SO_2-Ar-O-R^1 \quad (1j)$$

Here, only in the production scheme of the perfluoro compound represented by the general formula (1j) shown above, Ar represents a substituted or nonsubstituted divalent aromatic group having 8 to 30 nucleus atoms; $R^1$ represents a saturated or unsaturated monovalent hydrocarbon group having 1 to 20 carbon atoms; m represents a natural number of 2 to 16, and p represents an integer of 0 to 6; and $X^1$ represents a halogen atom such as an iodine atom, and $X^2$ represents a halogen atom such as a bromine atom.

As such a synthesis method, a synthesis method described in, for example, WO 2009/78268 can be referred to.

In the case where Ar is a group in which a plurality of aromatic rings such as a biphenylene group and a terphenylene group are bonded through single bonds, a perfluoro compound represented by the general formula (1j) shown above can be obtained, for example, by the following synthesis method. First, a thiol compound represented by the following general formula (1f) is sulfidized with the compound represented by the general formula (1b) shown above in a solvent such as dry THF in the presence of a base such as triethylamine to obtain a compound represented by the following general formula (1g). Here, in the formulae (1f) and (1g), m and p have the same meaning as in the formula (1j); $X^3$ represents a halogen atom such as a bromine atom; and $Ar^2$ represents a part of the divalent aromatic hydrocarbon group constituting Ar in the formula (1j) shown above.

$$HS-Ar^2-X^3 \quad (1f)$$

$$C_mF_{2m+1}C_pH_{2p}-S-Ar^2-X^3 \quad (1g)$$

Then, the compound represented by the general formula (1g) shown above is oxidized with an oxidizing agent such as hydrogen peroxide in the presence of a catalyst such as acetic acid to obtain the following compound (1h). Here, in the formula (1h), $Ar^2$, $X^3$, and m and p have the same meaning as in the formula (1g).

$$C_mF_{2m+1}C_pH_{2p}-SO_2-Ar^2-X^3 \quad (1h)$$

Then, a perfluoro compound represented by the general formula (1j) shown above is obtained through Suzuki-Miyaura coupling from the compound represented by the general formula (1h) shown above and a compound represented by the following general formula (1i) in a basic aqueous solution such as $K_2CO_3$ in the presence of a palladium catalyst. Here, in the formula (1i), $R^1$ has the same meaning as in the formula (1j) shown above; $Ar^3$ represents a part different from $Ar^2$ of the divalent aromatic hydrocarbon group constituting Ar in the formula (1j) shown above, and $Ar^2$ and $Ar^3$ are bonded through a single bond to make Ar.

$$R^1-O-Ar^3-B(OH)_2 \quad (1i)$$

Alternatively, the perfluoro compound according to the present embodiment can be synthesized, for example, by the following scheme. That is, a compound represented by the following general formula (IIIa) as one kind of perfluoro compounds can be synthesized by dehydrating condensation such as Mitsunobu reaction from a compound represented by the following general formula (1a) and a compound represented by the following general formula (IIa). Here, in the formula, each of $Y^1$ and $Y^2$ is independently a S atom or an O atom.

$$Rf^1\text{—}R^1\text{—}Y^1\text{—}Z\text{—}Y^2H \quad \text{(Ia)}$$

$$Rf^2R^2OH \quad \text{(IIa)}$$

$$Rf^2\text{—}R^1\text{—}Y^1\text{—}Z\text{—}Y^2\text{—}R^2\text{—}Rf^2 \quad \text{(IIIa)}$$

In the compound represented by the general formula (IIIa) shown above, in the case where $Y^1$ and/or $Y^2$ is a S atom, a compound represented by the following general formula (IVa) as another kind of perfluoro compounds can be synthesized by further sulfonylating or sulfoxidizing the S atom. Here, at least one of $Y^3$ and $Y^4$ is an SO group or an $SO_2$ group; and in the case where one of $Y^3$ and $Y^4$ is an SO group or an $SO_2$ group, the other thereof is a S atom or an O atom.

$$Rf^1\text{—}R^1\text{—}Y^3\text{—}Z\text{—}Y^4\text{—}R^2\text{—}Rf^2 \quad \text{(IVa)}$$

The compound represented by the general formula (1a) shown above can be synthesized, for example, by replacing an active hydrogen (a hydrogen atom of a thiol group or a hydroxyl group) of a compound represented by the following formula (Va) by a perfluoroalkyl group of a perfluoroalkane halogenide (for example, an iodide) under an alkaline condition.

$$HY^1\text{—}Z\text{—}Y^2H \quad \text{(Va)}$$

The compound represented by the formula (IIa) shown above can be synthesized by further reducing a halogenide of an alkanol obtained by an addition reaction of a perfluoroalkane halogenide (for example, an iodide) to an alkenol.

Here, only in the production scheme of the perfluoro compound represented by the general formula (IIIa) or (IVa) shown above, each of $Rf^1$ and $Rf^2$ independently represents a substituted or nonsubstituted perfluoroalkyl group having 2 to 18 carbon atoms of the main chain; each of $R^1$ and $R^2$ independently represents a single bond or a substituted or nonsubstituted divalent hydrocarbon group having 1 to 8 carbon atoms; and Z represents a substituted or nonsubstituted divalent aromatic hydrocarbon group or alicyclic hydrocarbon group having 5 to 30 nucleus atoms.

However, the synthesis methods of the perfluoro compounds according to the present embodiment are not limited to the above-mentioned methods.

(IV) The additive having a fluorine atom and/or a phosphorus atom in the molecule (hereinafter, also referred to as "a specific additive") is any one as long as having one or more of a fluorine atom and/or a phosphorus atom in the molecule.

Examples of the additive having a fluorine atom in the molecule include fluorine-substituted hydrocarbons, fluorine-substituted alkyl ethers, fluorine-containing esters, fluorine-containing amides (fluorinated amides), fluorine-containing carbonates, fluorine-containing phosphate (phosphite) esters, fluorine-containing phosphate (phosphite) salts and fluorine-containing polymers. In the present description, "fluorine-substituted" means the replacement of a part of or all of hydrogen atoms by fluorine atom(s), and "phosphate (phosphite)" means a phosphate and a phosphite corresponding thereto.

Among these, as the fluorine-substituted alkyl ethers, for example, compounds can be used which are cited, for example, in Japanese Patent Application Laid-Open Nos. 8-37024, 9-97627, 11-26015, 2000-294281 and 2001-52737.

Above all, from the viewpoint of the compatibility with an electrolyte solution, a fluorine-substituted alkyl ether having a structure represented by the general formula: $Rf^a\text{—}O\text{—}Rf^b$ is preferable. Here, each of $Rf^a$ and $Rf^b$ independently represents a fluoroalkyl group having one or more fluorine atoms. Examples of such a fluorine-substituted alkyl ether include 2,2,2-trifluoroethyl difluoromethyl ether, 2,2,3,3,3-pentafluoropropyl difluoromethyl ether, 2,2,3,3,3-pentafluoropropyl-1,1,2,2-tetrafluoroethyl ether, 1,1,2,2-tetrafluoroethyl-2,2,3,3-tetrafluoropropyl ether, 1,1,2,2-tetrafluoroethyl-2,2,2-trifluoroethyl ether, 1,1,3,3-pentafluoro-2-trifluoromethyl propylmethyl ether and 2,2,3,4,4,4-hexafluorobutyl difluoromethyl ether.

Examples of the fluorine-containing amide include trifluoroacetamide, N-methylbisfluoroacetamide, N-methyltrifluoromethanesulfonyl trifluoroacetoamide, trifluoromethyl-2-pyridinone, tetrafluoroisophthalamide, difluoroacetanilide and difluorobenzamide.

Examples of the fluorine-substituted hydrocarbon include monofluorobenzene, difluorobenzene, trifluorobenzene, tetrafluorobenzene, hexafluorobenzene, trifluoroethylene, tetrafluoroethylene, hexafluoropropylene and perfluorohexylethylene.

Examples of the fluorine-containing ester include compounds having a structure represented by the general formula: $Rf^c\text{—}COO\text{—}Rf^d$. Here, each of $Rf^c$ and $Rf^d$ independently represents a fluoroalkyl group having one or more fluorine atoms. The fluorine-containing esters further include cyclic ester compounds and fluorine-containing lactones.

Examples of the fluorine-containing carbonate include compounds having a structure represented by the general formula: $Rf^e\text{—}OCOO\text{—}Rf^f$. Here, each of $Rf^e$ and $Rf^f$ independently represents a fluoroalkyl group having one or more fluorine atoms. The fluorine-containing carbonates further include fluorine-containing cyclic carbonates represented by monofluoroethylene carbonate, difluoroethylene carbonate and trifluoropropylene carbonate.

Examples of the fluorine-containing polymer include polyvinylidene fluoride, polytetrafluoroethylene, fluorine rubber, homopolymers of fluoroalkyl(meth)acrylate, homopolymers of fluoroolefin, and copolymers of the above-mentioned monomers, and copolymers of the above-mentioned monomers and other monomers.

The specific additive is preferably one having an amount of fluorine atoms satisfying the condition expressed by the following expression (18):

$$(N_F)/(N_F+N_H)\geq 0.5 \quad (18)$$

wherein $N_F$ indicates the number of fluorine atoms per molecule of the specific additive; and $N_H$ indicates the number of hydrogen atoms per molecule of the specific additive. If the specific additive satisfies such a condition, it is preferable from the viewpoint of a more enhanced effect of improving the safety such as inhibition of combustion and thermal runaway.

Examples of the additive having a phosphorus atom in the molecule include phosphoric acid compounds represented by phosphoric acids, phosphoric acid metal salts and phosphate esters, and reducing phosphorus compounds represented by phosphorous acid compounds and hypophosphorous acid compounds such as phosphorous acids, hypophosphorous acids, phosphorous acid metal salts, hypophosphorous acid metal salts and phosphite esters, and phosphazene compounds.

Examples of the phosphoric acids, phosphorous acids and hypophosphorous acids include phosphoric acid, phosphorous acid, hypophosphorous acid, pyrophosphoric acid and diphosphorous acid. Examples of the phosphoric acid metal salts, phosphorous acid metal salts and hypophosphorous acid metal salts include salts of the phosphoric acids, phosphorous acids and hypophosphorous acids with chemical species selected from the group consisting of elements of group 1 and group 2 of the periodic table, manganese, zinc, aluminum, ammonia, alkylamines, cycloalkylamines and diamines.

The phosphate esters and phosphite esters include ones represented by the following general formula (4):

$(OR)_n P(OH)_{3-n}$      (4)

wherein n represents 1, 2 or 3; R represents an alkyl group, a phenyl group or a substituted alkyl or phenyl group a part of which is substituted with a monovalent hydrocarbon group and/or a halogen atom. In the case where n is 2 or more, the plurality of OR groups in the general formula (4) may be identical or different from each other. Examples of R include monovalent aliphatic hydrocarbon groups such as a methyl group, an ethyl group, an n-propyl group, an n-butyl group, a t-butyl group, an n-hexyl group, a cyclohexyl group, an n-octyl group, a nonyl group, a decyl group, a stearyl group and an oleyl group. R also may be a monovalent aromatic hydrocarbon group such as a phenyl group and a biphenyl group. Alternatively, R further may be a monovalent group having a substituent(s) represented by a hydroxyl group, a methyl group, an ethyl group, a propyl group, a methoxy group or an ethoxy group, or a halogen atom(s) represented by a fluorine atom, a chlorine atom or a bromine atom substituted for a part of hydrocarbon atom(s) of the monovalent aliphatic hydrocarbon group or aromatic hydrocarbon group.

The phosphazene compounds may be cyclic phosphazenes or acyclic ones, and examples thereof include phenoxyphosphazenes and polyphosphazenes.

As the additive having a phosphorus atom in the molecule, phosphate (phosphite) ester compounds and phosphazene compounds are preferable, and phosphite ester compounds in which n is 3 in the general formula (4) shown above are more preferable.

These specific additives are used singly or in combination of two or more.

From the viewpoint of battery characteristics, the specific additives are preferably reducing phosphorus compounds, fluorine-containing amides, fluorine-substituted alkyl ethers and phosphazene compounds, more preferably reducing phosphorus compounds, fluorine-containing amides and fluorine-substituted alkyl ethers, and still more preferably reducing phosphorus compounds. Particularly as the reducing phosphorus compound, phosphite ester compounds in which n is 3 in the general formula (4) shown above are preferable, and additionally, phosphite ester compounds in which R is a monovalent group having a fluorine atom are more preferable. Examples of such a phosphite ester compound include bis(2,2,2-trifluoroethyl)phosphite, tris(2,2,2-trifluoroethyl)phosphite, tris(2,2,2-trifluoromethyl)phosphite, tris(2-chloroethyl)phosphite, tris(trimethylsilyl)phosphite, trimethyl phosphite and triethyl phosphite.

The specific additive is preferably a compound having a fluorine atom and a phosphorus atom in the molecule. Simultaneously having a fluorine atom and a phosphorus atom in the molecule can provide both the battery safety and the battery characteristics derived from both the atoms, and can exhibit the advantage more effectively. From such a viewpoint, in the general formula (4) described above, phosphite ester compounds in which n is 3 and R is a monovalent group having a fluorine atom are especially preferable.

In the electrolyte solution according to the present embodiment, the content of an additive having a fluorine atom and/or a phosphorus atom in the molecule is optional, but the content of the specific additive to the total amount of a nonaqueous solvent and an electrolyte in terms of mass, (the additive/(the nonaqueous solvent and the electrolyte)), is preferably 1/99 to 50/50, and more preferably 5/95 to 40/60. If the content is in the range of the numerical values, battery characteristics and safety of batteries using the electrolyte solution can be both simultaneously satisfied in higher levels.

The mixing ratio of a nonaqueous solvent, a lithium salt, a perfluoro compound and a specific additive can be selected according to the purpose, but it is desirable that the concentration of the electrolyte, the content of the perfluoro compound and the content of the specific additive are all in the above-mentioned preferable ranges, and further in the more preferable ranges. Preparation of an electrolyte solution in such a composition enables all of battery characteristics, handleability and safety to be much better.

A preparation method of the electrolyte solution according to the present embodiment is not especially limited as long as being a method of mixing the each component described above, and the mixing order of an electrolyte, a nonaqueous solvent, a perfluoro compound and a specific additive does not matter. For example, after an electrolyte and a nonaqueous solvent in predetermined amounts are mixed to prepare a mother electrolyte solution, a perfluoro compound and a specific additive may be mixed in the mother electrolyte solution to obtain the electrolyte solution according to the present embodiment. Alternatively, all the components may also be simultaneously mixed in predetermined amounts to allow the electrolyte solution according to the present embodiment to be obtained. In the case where the perfluoro compound functions also as a gelling agent, it is preferable that a mixture containing the perfluoro compound is once heated, and cooled to room temperature in the state that the each component in the mixture are homogeneous.

The electrolyte solution according to the present embodiment is especially excellent in satisfying the safety demanded for lithium ion secondary batteries and the battery characteristics, and is used suitably in a lithium ion secondary battery.

<Positive Electrode>

The positive electrode is not especially limited as long as acting as a positive electrode of a lithium ion secondary battery, and may be a well-known one. The positive electrode preferably contains one or more materials selected from the group consisting of materials capable of doping and dedoping lithium ions, as a positive electrode active substance. Examples of such a material include composite oxides represented by the general formulae (6a) and (6b) shown below, metal chalcogenides and metal oxides having a tunnel structure or a layered structure, and olivine-type phosphoric acid compounds.

$Li_x MO_2$      (6a)

$Li_y M_2 O_4$      (6b)

wherein M represents one or more metals selected from transition metals; and x represents a number of 0 to 1, and y represents a number of 0 to 2.

More specific examples thereof include lithium cobalt oxides typically represented by $LiCoO_2$; lithium manganese oxides represented by $LiMnO_2$, $LiMn_2O_4$ and $Li_2Mn_2O_4$; lithium nickel oxides typically represented by $LiNiO_2$; composite metal oxides containing lithium typically represented by $Li_zMO_2$ (M represents two or more elements selected from the group consisting of Ni, Mn, Co, Al and Mg, and z represents a number exceeding 0.9 and less than 1.2); and iron phosphate olivines represented by $LiFePO_4$. Examples of the positive electrode active substance also include oxides of metals other than lithium, typically represented by S, $MnO_2$, $FeO_2$, $FeS_2$, $V_2O_5$, $V_6O_{13}$, $TiO_2$, $TiS_2$, $MoS_2$ and $NbSe_2$. Further examples of the positive electrode active substance include conductive polymers typically represented by polyaniline, polythiophene, polyacetylene and polypyrrole.

A lithium-containing compound used as a positive electrode active substance is preferable since a high voltage and a high energy density are likely to be obtained. Such a lithium-containing compound suffices if containing lithium, and examples thereof include composite oxides containing lithium and a transition metal element, phosphate compounds containing lithium and a transition metal element, and silicate metal compounds containing lithium and a transition metal element (for example, $Li_tM_uSiO_4$, wherein M has the same meaning as in the formula (6a) shown above; t represents a number of 0 to 1, and u represents a number of 0 to 2). From the viewpoint of obtaining a higher voltage, especially composite oxides and phosphate compounds are preferable which contain lithium and one or more transition metal elements selected from the group consisting of cobalt (Co), nickel (Ni), manganese (Mn), iron (Fe), copper (Cu), zinc (Zn), chromium (Cr), vanadium (V) and titanium (Ti).

As such lithium-containing compounds, more specifically preferable are metal oxides containing lithium, metal chalcogenides containing lithium and metal phosphate compounds containing lithium, and examples thereof include compounds represented by the general formulae (7a) and (7b) shown below.

$$Li_vM^IO_2 \tag{7a}$$

$$Li_wM^{II}PO_4 \tag{7b}$$

wherein each of $M^I$ and $M^{II}$ represents one or more transition metal elements; and values of v and w depend on the charge/discharge state of a battery, but v usually represents a number of 0.05 to 1.10 and a number of 0.05 to 1.10, respectively.

Compounds represented by the general formula (7a) shown above generally have a layered structure; and compounds represented by the general formula (7b) shown above generally have an olivine structure. These compounds include, in order to stabilize the structure and otherwise, ones in which part of transition metal elements are substituted with Al, Mg and other transition metal elements, or these are made contained in grain boundaries, and ones in which part of oxygen atoms are substituted with fluorine atoms and the like. These compounds further include ones in which at least a part of the surface of a positive electrode active substance is coated with another positive electrode active substance.

The positive electrode active substance is used singly or in combination of two or more.

The number-average particle diameter (primary particle diameter) of a positive electrode active substance is preferably 0.05 μm to 100 μm, and more preferably 1 μm to 10 μm. The number-average particle diameter of a positive electrode active substance can be measured by a wet-type particle diameter analyzer (for example, a laser diffraction/scattering particle size distribution analyzer and a dynamic scattering particle size analyzer). Alternatively, 100 particles of particles observed by a transmission electron microscope are randomly extracted, and analyzed by an image analysis software (for example, "A-Zo-Kun" by trade name, made by Asahi Kasei Engineering Corp.) to obtain the particle diameter as an arithmetic average. In this case, if number-average particle diameters are different between measurement methods in the same sample, calibration curves fabricated using a standard sample as a measurement object may be used.

A positive electrode is obtained, for example, as follows. That is, a positive electrode mixture-containing paste is first prepared by dispersing, in a solvent, a positive electrode mixture obtained by adding a conductive aid, a binder and the like, as required, to the positive electrode active substance. Then, the positive electrode mixture-containing paste is applied on a positive electrode current collector, and dried to form a positive electrode mixture layer, which is, as required, pressurized and regulated in the thickness to fabricate a positive electrode.

Here, the solid-content concentration of the positive electrode mixture-containing paste is preferably 30 to 80% by mass, and more preferably 40 to 70% by mass.

The positive electrode current collector is constituted of a metal foil such as an aluminum foil or a stainless steel foil.

<Negative Electrode>

The negative electrode is not especially limited as long as acting as a negative electrode of a lithium ion secondary battery, and may be a well-known one. The negative electrode preferably contains one or more materials selected from the group consisting of materials capable of doping and dedoping lithium ions and metallic lithium, as a negative electrode active substance. That is, the negative electrode preferably comprises, as the negative electrode active substances, one or more materials selected from the group consisting of a metal lithium, carbon materials, materials containing an element alloyable with lithium, and lithium-containing compounds. Examples of such materials include, in addition to metallic lithium, carbon materials typically represented by hard carbon, soft carbon, artificial graphite, natural graphite, graphite, pyrolytic carbon, coke, glassy carbon, sintered compacts of organic polymer compounds, mesocarbon microbeads, carbon fiber, activated carbon, graphite, carbon colloid and carbon black. Among these, examples of the coke include pitch coke, needle coke and petroleum coke. The sintered compacts of organic polymer compounds are ones obtained by sintering and carbonizing polymer materials such as phenol resins and furan resins at a suitable temperature. In the present invention, batteries employing metallic lithium as the negative electrode active substance are included in the lithium ion secondary battery.

Materials capable of doping and dedoping lithium ions further include materials containing an element capable of forming an alloy with lithium. The material may be a single substance of a metal or a semimetal, or an alloy thereof, or may be a material which has one or more phases of these as at least a part of the material.

In the present description, an "alloy" includes, in addition to ones composed of two or more metal elements, ones having one or more metal elements and one or more semimetal elements. If an alloy has metallic properties as a whole, the alloy may contain a nonmetal element. In the texture of the alloy, a solid solution, a eutectic (eutectic mixture), an intermetallic compound or two or more thereof coexist.

Examples of such metal elements and semimetal elements include titanium (Ti), tin (Sn), lead (Pb), aluminum, indium (In), silicon (Si), zinc (Zn), antimony (Sb), bismuth (Bi), gallium (Ga), germanium (Ge), arsenic (As), silver (Ag), hafnium (Hf), zirconium (Zr) and yttrium (Y).

Above all, metal elements and semimetal elements of Group 4 or 14 in the long-form periodic table of the elements are preferable, and especially preferable are titanium, silicon and tin.

Examples of tin alloys include ones having, as a second constituent element other than tin, one or more elements selected from the group consisting of silicon, magnesium (Mg), nickel, copper, iron, cobalt, manganese, zinc, indium, silver, titanium (Ti), germanium, bismuth, antimony and chromium (Cr).

Examples of silicon alloys include ones having, as a second constituent element other than silicon, one or more elements selected from the group consisting of tin, magnesium, nickel, copper, iron, cobalt, manganese, zinc, indium, silver, titanium, germanium, bismuth, antimony and chromium.

Examples of compounds of titanium, compounds of tin and compounds of silicon include ones having oxygen (O) or carbon (C), and these may have, in addition to titanium, tin or silicon, an above-mentioned second constituent element.

The materials capable of doping and dedoping lithium ions include lithium-containing compounds. As the lithium-containing compound, the same material as exemplified as the positive electrode material can be used.

The negative electrode active substance is used singly or in combination of two or more.

The number-average particle diameter (primary particle diameter) of the negative electrode active substance is preferably 0.1 µm to 100 µm, and more preferably 1 µm to 10 µm. The number-average particle diameter of a negative electrode active substance is measured as in the number-average particle diameter of a positive electrode active substance.

A negative electrode is obtained, for example, as follows. That is, a negative electrode mixture-containing paste is first prepared by dispersing, in a solvent, a negative electrode mixture obtained by adding a conductive aid, a binder and the like, as required, to the negative electrode active substance. Then, the negative electrode mixture-containing paste is applied on a negative electrode current collector, and dried to form a negative electrode mixture layer, which is, as required, pressurized and regulated in the thickness to fabricate a negative electrode.

Here, the solid-content concentration of the negative electrode mixture-containing paste is preferably 30 to 80% by mass, and more preferably 40 to 70% by mass.

The negative electrode current collector is constituted of a metal foil such as a copper foil, a nickel foil or a stainless steel foil.

Examples of the conductive aid used as required in fabrication of a positive electrode and a negative electrode include graphite, and carbon black typically represented by acetylene black and Ketjen Black, and carbon fiber. The number-average particle diameter (primary particle diameter) of the conductive aid is preferably 0.1 µm to 100 µm, and more preferably 1 µm to 10 µm, and measured as in the number-average particle diameter of a positive electrode active substance. Examples of the binder include PVDF, PTFE, polyacrylic acid, styrene-butadiene rubber and fluororubber.

<Separator>

The lithium ion secondary battery according to the present embodiment is preferably equipped with a separator between the positive electrode and the negative electrode from the viewpoint of preventing short circuit between the positive and negative electrodes and imparting the safety such as shutdown. The separator may be the similar one as equipped in well-known lithium ion secondary batteries, and is preferably an insulating thin membrane having a high ion permeability and an excellent mechanical strength. Examples of the separator include woven fabric, nonwoven fabric and synthetic resin-made microporous membranes, and above all, synthetic resin-made microporous membranes are preferable. Examples of synthetic resin-made microporous membranes to be suitably used are polyolefinic microporous membranes such as microporous membranes containing polyethylene or polypropylene as a main component, and microporous membranes containing these polyolefins together. The nonwoven fabric to be used is heat-resistant resin-made porous membranes such as ceramic-made, polyolefin-made, polyester-made, polyamide-made, liquid crystal polyester-made and aramide-made ones.

The separator may be one composed of a single layer of one microporous membrane or of a plurality of layers laminated, or may be one obtained by laminating two or more microporous membranes.

The lithium ion secondary battery according to the present embodiment is, for example, a lithium ion secondary battery whose sectional view is schematically illustrated in FIG. 1. The lithium ion secondary battery 100 illustrated in FIG. 1 comprises a separator 110, a positive electrode 120 and a negative electrode 130 interposing the separator 110 from both sides thereof, a positive electrode current collector 140 (arranged outside the positive electrode) and a negative electrode current collector 150 (arranged outside the negative electrode) interposing the laminate of the positive electrode 120, the separator 110 and the negative electrode 130, and a battery armor 160 which accommodate them. The laminate of the positive electrode 120, the separator 110 and the negative electrode 130 is impregnated with the electrolyte solution according to the present embodiment. These respective members to be usable are ones equipped in conventional lithium ion secondary batteries, excluding the electrolyte solution, and may be, for example, the above-mentioned ones.

<Fabrication Method of a Battery>

The lithium ion secondary battery according to the present embodiment is fabricated by a well-known method by using the above-mentioned electrolyte solution, positive electrode, negative electrode, and as required, separator. For example, the positive electrode and the negative electrode are wound in a laminate state with the separator interposed therebetween to be formed into a laminate of a wound structure, or these are folded or laminated as a plurality of layers to be formed into a laminate in which the separator is interposed between pluralities of the positive electrodes and the negative electrodes alternately laminated. Then, the laminate is accommodated in a battery case (armor); the electrolyte solution according to the present embodiment is injected inside the case to impregnate the laminate with the electrolyte solution; and the case is sealed, whereby the lithium ion secondary battery according to the present embodiment can be fabricated. Alternatively, an electrolyte membrane containing a gelatinized electrolyte solution is fabricated in advance; the positive electrode, the negative electrode, the electrolyte membrane, and as required, the separator are folded or laminated as described above to be formed into a laminate; and thereafter, the laminate is accommodated in a battery case, whereby a lithium ion secondary battery can be fabricated. The shape of the lithium ion secondary battery according to the present embodiment is not especially limited, and examples of the shape preferably employed are a cylindrical one, an oval one, a rectangular cylindrical one, a button-like one, a coin-like one and a laminate-like one.

The electrolyte solution according to the present embodiment actualizes a high conductivity and a high safety (for example, flame retardancy and liquid retainability); and the lithium ion secondary battery has high battery characteristics (for example, charge/discharge characteristics, low-temperature operability and high-temperature durability) and simultaneously actualizes a high safety as well. Specifically, since the electrolyte solution contains a gelling agent exhibiting only a small influence on the properties of the electrolyte solution, the electrolyte solution and the lithium ion secondary battery according to the present embodiment can suppress remarkable decreases in the conductivity and the battery characteristics, which are seen in conventional polymer batteries. By making the electrolyte solution contain an additive having a function as a gelling agent as well as a combustion suppressing effect, the electrolyte solution is of course prevented from leaking outside the battery, and the lithium ion secondary battery according to the present embodiment can also reduce the dangerousness due to lithium dendrite and the dangerousness of combustion. Concurrent use of both the additives enables to suppress the decrease of charge/discharge cycle characteristics derived from the additives, and can achieve a high safety, which cannot be achieved by a single additive.

Hitherto, the embodiment to carry out the present invention has been described, but the scope of the present invention is not limited to the above-mentioned embodiment. The present invention may be variously changed and modified without departing from the gist.

EXAMPLES

Hereinafter, the present invention will be described further in detail by way of Examples, but the present invention is not limited to these Examples. The various characteristics and the safety of an electrolyte solution and a lithium ion secondary battery were measured and evaluated as follows.

(i) Evaluation of the Gelling Power of an Electrolyte Solution

An electrolyte solution was prepared in a glass sample bottle by mixing the components, and was left to stand at 25° C. for 2 hours; thereafter, the sample bottle was turned upside down to observe the fluidity to thereby evaluate the gelling power. An electrolyte solution exhibiting no flow was evaluated as "gel", which was determined under the following standard.

A: the electrolyte solution was fully gelatinized, and the gelatinous state was held also after 3 days.

B: although the electrolyte solution was gelatinized, the gelatinous state could not be held if being left at rest for 3 days.

C: the electrolyte solution was not gelatinized.

(ii) Measurement of the Conductivity of an Electrolyte Solution

An electrolyte solution was prepared by mixing each component in a sample bottle. A conductivity measurement cell "CT-57101B" (trade name), made by DKK-TOA Corp., connected to a conductivity tester "CM-30R" (trade name), made by DKK-TOA Corp., was inserted into the sample bottle with the electrolyte solution charged therein; and the temperature of the system was raised to a uniform one. Thereafter, the sample bottle was cooled to 30° C. with the conductivity measurement cell being inserted, and the conductivity at 30° C. of the electrolyte solution was measured.

(iii) Measurement of the Diffusion Coefficient of an Electrolyte Solution Component The prepared electrolyte solution was introduced in a symmetrical sample tube (5 mmϕ, for DMSO), made by Shigemi Inc.; and diffusion coefficients at 30° C. of lithium ions and counter anions were evaluated. The evaluation of the diffusion coefficients was carried out by using an ECA400 (trade name, the frequency: 400 MHz) being PFG-NMR, made by JEOL Ltd., and installing a GR probe capable of applying magnetic field-gradient pulses up to 13 T/m. In the magnetic field-gradient NMR spectrometry, if a peak height observed is represented as E; a peak height in the case of no magnetic field-gradient pulses applied, as $E_0$; a nuclear magnetic rotation ratio, as $\gamma$ $(T^{-1} \cdot s^{-1})$; a magnetic field-gradient intensity, as g $(T \cdot m^{-1})$; a time to apply magnetic field-gradient pulses, as $\delta$ (s); a diffusion wait time, $\Delta$ (s); and a self-diffusion coefficient, as D $(m^2 \cdot s^{-1})$, the following expression (17) is satisfied.

$$\mathrm{Ln}(E/E_0) = -D \times \gamma^2 \times g^2 \times \delta^2 \times (\Delta - \delta/3) \quad (17)$$

The NMR sequence used the bpp-led-DOSY method. By fixing $\Delta$ and $\delta$, and changing g as 15 or more points of g in the range from 0 to $\mathrm{Ln}(E/E_0) \leq -3$, a straight line with $\mathrm{Ln}(E/E_0)$ taken as the Y axis and $\gamma^2 \times g^2 \times \delta^2 \times (\Delta - \delta/3)$ taken as the X axis was plotted, and D was acquired from the gradient of the straight line. $^7$Li (lithium ion) and $^{19}$F (counter anion) were used as measuring nuclei for the measurement. A larger diffusion coefficient is estimated to have a higher diffusion rate.

The lithium ion transport number was calculated from the diffusion coefficient ratio of lithium ions and counter anions.

(iv) Safety Test (Flammability Test) of an Electrolyte Solution

The safety of a battery was evaluated by carrying out the flammability test of an electrolyte solution component. First, 1 mL of an electrolyte solution whose temperature had been raised to 70° C. was sucked in a glass paper filter of 13 mm×125 mm×2 mm; thereafter, the glass paper filter is cooled to 25° C. to prepare a sample. The sample was set on an "mcm-2" (trade name) being a multi-calorimeter, made by Toyo Seiki Seisaku-sho, Ltd., and subjected to a horizontal flammability test of UL94HB. After the ignition, the time (lapsed time) required for propagation of flame to the end of the paper filter and the time (afterflame time) taken for quenching after the flame has propagated to the end of the paper filter were measured. A longer lapsed time has a larger effect of retarding the combustion, a shorter afterflame time has an effect of having a higher quenching ability, and it is estimated to give a higher safety.

(v) Liquid Retainability Test of an Electrolyte Solution

An electrolyte solution was fully impregnated in a polypropylene-made nonwoven fabric (porosity: 73%) of 5 cm$^2$× 0.012 cm. Thereafter, the nonwoven fabric was interposed between two glass sheets to prepare a sample. The sample was placed on a table, and pressurized from one surface (upper surface) thereof by a hydraulic press; and the pressure when liquid leakage started was measured. The above-mentioned nonwoven fabric and the sample impregnated in the nonwoven fabric were pressurized up to 4 kgf/cm$^2$ (about 0.39 MPa), and the change in the porosity of the nonwoven fabric and the change in the mass of the sample before and after the pressurization were measured. From the values, the liquid retention ratio due to pressurization was determined.

(vi) Measurement of the Discharge Capacity of a Lithium Ion Secondary Battery

The discharge characteristic of a lithium ion secondary battery was evaluated by measuring the discharge capacity at a specific discharge current. As a lithium ion secondary battery for the measurement, a small-sized battery of 1 C=6 mA was fabricated and used. The measurement was carried out using a charge/discharge tester ACD-01 (trade name), made by Aska Electronic Co., Ltd. and a constant temperature bath PLM-63S (trade name), made by Futaba Kagaku Co., Ltd. The battery was charged at a constant current of 6 mA, and after the voltage reached 4.2 V, the battery was charged at a constant voltage of 4.2 V, for a total charge time of 3 hours. Thereafter, the discharge capacity when the battery was discharged at a constant current down to 3.0 V was measured. The discharge current was set at 6 mA and 18 mA and the discharge capacities were measured. The battery-surrounding temperature at this time was set at 25° C.

(vii) Measurement of the Discharge Capacity of a Laminate-Type Lithium Ion Secondary Battery The discharge capacity was measured as in "(v) Measurement of the discharge capacity of as lithium ion secondary battery" to evaluate the discharge characteristic of a lithium ion secondary battery. As a lithium ion secondary battery for the measurement, a single layer laminate-type battery of 1 C=45.0 mA was fabricated and used. The measurement was carried out using a charge/discharge tester ACD-01 (trade name), made by Aska Electronic Co., Ltd. and a constant temperature bath PLM-63S (trade name), made by Futaba Kagaku Co., Ltd. The battery was charged at a constant current of 9.0 mA, and after the voltage reached 4.2 V, the battery was charged at a constant voltage of 4.2 V, for a total charge time of 8 hours. Thereafter, the discharge capacity when the battery was discharged at a constant current down to 2.75 V was measured. The discharge current was set at 45.0 mA and the discharge capacities were measured. The battery-surrounding temperature at this time was set at 25° C.

(viii) Measurement of the Capacity Retention Rate of a Lithium Ion Secondary Battery (Cycle Test)

The measurement of the capacity retention rate was carried out using a charge/discharge tester ACD-01 (trade name), made by Aska Electronic Co., Ltd. and a constant temperature bath PLM-63S (trade name), made by Futaba Kagaku Co., Ltd. As a lithium ion secondary battery for the measurement, a battery was fabricated as in "(v) Measurement of the discharge capacity of as lithium ion secondary battery", and used. In the charge/discharge cycle test, the battery was first charged at a constant current of 6 mA, and after the voltage reached 4.2 V, the battery was charged at a constant voltage of 4.2 V, for a total charge time of 3 hours. Thereafter, the battery was discharged at a constant current of 6 mA, and at the time when the voltage reached 3.0 V, charging was again repeated. Carrying out charging and discharging each one time was defined as 1 cycle, and charging/discharging of 100 cycles was carried out. With the discharge capacity at 2 cycles set as 100%, the discharge capacity at 100 cycles was defined as a capacity retention rate. The battery-surrounding temperature was set at 25° C.

(ix) Test of Lithium Electrodeposition of a Lithium Ion Secondary Battery

The lithium electrodeposition test was carried out using a single layer laminate-type battery fabricated as in "(vi) Measurement of the discharge capacity of a laminate-type lithium ion secondary battery". The battery charged at a constant current of 9.0 mA up to 4.2 V was discharged at 9.0 mA up to 3.0 V; and the battery was further charged at a constant current of 45 mA for 1.5 hours. The charged battery was dismantled under the atmosphere of a dew point of −60° C. or lower and a moisture concentration of 10 ppm or less. The negative electrode surface of the dismantled battery was observed by an optical microscope of a magnification of 2,000X, and the lithium electrodeposition behavior was evaluated under the following standard.

A: No electrodeposition of lithium was observed.

B: Electrodeposition of lithium was observed, but the surface of the deposit was smooth.

C: Electrodeposition of lithium was observed, and sharp dendrite was observed on the surface of the deposit.

The electrodeposition of dendrite causes battery short circuit, and causes a decrease in the battery safety.

Example 1

(1) Preparation of an Electrolyte Solution

Ethylene carbonate and methyl ethyl carbonate were mixed in a mass ratio of 1:2; $LiPF_6$ was added to the mixed solution so that the concentration became 1 mol/L to fabricate an ungelatinized electrolyte solution (X) (hereinafter, an electrolyte solution before addition of a gelling agent is referred to as "base electrolyte solution"). A compound represented by the formula (8) shown below as a perfluoro compound and (A) tris(2,2,2-trifluoroethyl)phosphite as a specific additive were added to the base electrolyte solution (X), heated at 70° C. and homogeneously mixed. The mixed solution was thereafter cooled to 25° C. to obtain an electrolyte solution (a), and the evaluation described in the above-mentioned "(i) Evaluation of the gelling power of an electrolyte solution" was carried out. The results are shown in Table 1 (Table 1-1).

[Formula 4]

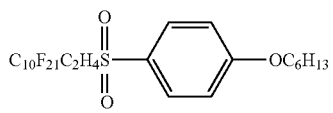

(8)

Examples 2 to 18

Electrolyte solutions (b), (c), (d), (e), (f), (g), (h), (i), (j), (k), (l), (m), (n), (ad), (ae), (af) and (aj) were prepared as in Example 1, except for using, as a perfluoro compound, one of the compounds represented by the formula (8) shown above, and the following formulae (9), (10), (11), (12), (13), (14), (15) and (16), and using, as a specific additive, one of (A) tris(2,2,2-trifluoroethyl)phosphite, (B) trimethyl phosphite, (C) 2,2,3,3,3-pentafluoropropyl-1,1,2,2-tetrafluoroethyl ether, (D) 1,1,2,2-tetrafluoroethyl-2,2,3,3-tetrafluoropropyl ether and (E) N-methylbisfluoroacetamide, and altering the heating temperatures. For these electrolyte solutions, the evaluation described in the above-mentioned "(i) Evaluation of the gelling power of an electrolyte solution" was carried out. The results are shown in Table 1 (Table 1-1 and Table 1-2). Here, in Table 1, the case where the heating temperature is indicated as "−" means no heating (hereinafter, the same).

[Formula 5]

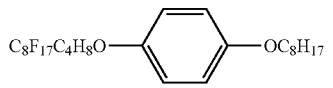

(9)

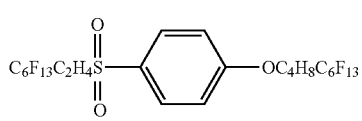

(10)

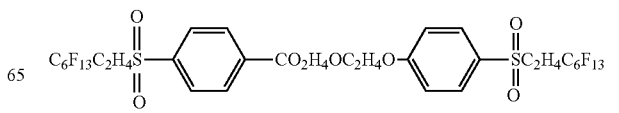

(11)

-continued

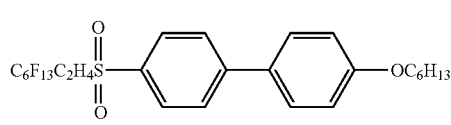
(12)

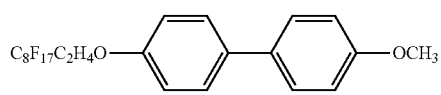
(13)

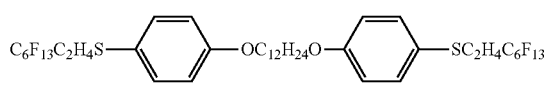
(14)

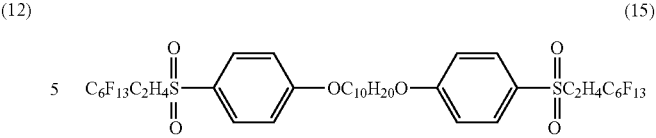
(15)

$$CF_3CF_2CH_2OCF_2CF_2H \quad (16)$$

Comparative Examples 1 to 19

Electrolyte solutions (o), (p), (q), (r), (s), (t), (u), (v), (w), (x), (y), (z), (aa), (ab), (ac), (ag), (ah), (ai) and (ak) were prepared as in Example 1, except for introducing no perfluoro compound and/or no specific additive. For these electrolyte solutions, the evaluation described in the above-mentioned "(i) Evaluation of the gelling power of an electrolyte solution" was carried out. The results are shown in Table 1 (Table 1-2 to Table 1-4).

TABLE 1-1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Electrolyte Solution | (a) | (b) | (c) | (d) | (e) | (f) | (g) | (h) | (i) | (j) |
| Perfluoro Compound Kind | (8) | (8) | (8) | (8) | (9) | (10) | (11) | (12) | (12) | (12) |
| Amount (wt %) | 1 | 1 | 3 | 1 | 2 | 5 | 3 | 1 | 3 | 1 |
| Additive Kind | (A) | (A) | (A) | (B) | (A) | (A) | (A) | (A) | (A) | (B) |
| Amount (wt %) | 10 | 20 | 10 | 10 | 10 | 10 | 10 | 10 | 10 | 10 |
| Heating Temperature (° C.) | 70 | 70 | 75 | 70 | 70 | 90 | 75 | 80 | 85 | 80 |
| Gelling Power | A | A | A | A | A | A | A | A | A | A |

TABLE 1-2

|  | Example 11 | Example 12 | Example 13 | Example 14 | Example 15 | Example 16 |
|---|---|---|---|---|---|---|
| Electrolyte Solution | (k) | (l) | (m) | (n) | (ad) | (ae) |
| Perfluoro Compound Kind | (12) | (12) | (12) | (12) | (13) | (14) |
| Amount (wt %) | 3 | 3 | 3 | 3 | 1 | 1 |
| Additive Kind | (C) | (D) | (D) | (E) | (A) | (A) |
| Amount (wt %) | 40 | 40 | 60 | 40 | 10 | 10 |
| Heating Temperature (° C.) | 75 | 75 | 80 | 75 | 65 | 70 |
| Gelling Power | A | A | A | A | A | A |

|  | Example 17 | Example 18 | Comparative Example 1 | Comparative Example 2 |
|---|---|---|---|---|
| Electrolyte Solution | (af) | (aj) | (o) | (p) |
| Perfluoro Compound Kind | (15) | (16) | (8) | (8) |
| Amount (wt %) | 5 | 1 | 1 | 3 |
| Additive Kind | (A) | (A) | — | — |
| Amount (wt %) | 10 | 10 | — | — |
| Heating Temperature (° C.) | 110 | 30 | 70 | 75 |
| Gelling Power | A | C | A | A |

TABLE 1-3

|  | Comparative Example 3 | Comparative Example 4 | Comparative Example 5 | Comparative Example 6 | Comparative Example 7 |
|---|---|---|---|---|---|
| Electrolyte Solution | (g) | (r) | (s) | (t) | (u) |
| Perfluoro Compound Kind | (9) | (10) | (11) | (12) | (12) |
| Amount (wt %) | 2 | 5 | 2 | 1 | 3 |
| Additive Kind | — | — | — | — | — |
| Amount (wt %) | — | — | — | — | — |
| Heating Temperature (° C.) | 70 | 90 | 75 | 80 | 85 |
| Gelling Power | A | A | A | A | A |

|  | Comparative Example 8 | Comparative Example 9 | Comparative Example 10 | Comparative Example 11 | Comparative Example 12 |
|---|---|---|---|---|---|
| Electrolyte Solution | (v) | (w) | (x) | (y) | (z) |
| Perfluoro Compound Kind | — | — | — | — | — |
| Amount (wt %) | — | — | — | — | — |
| Additive Kind | (A) | (A) | (B) | (C) | (D) |
| Amount (wt %) | 10 | 20 | 10 | 40 | 40 |
| Heating Temperature (° C.) | 30 | 30 | 30 | 30 | 30 |
| Gelling Power | C | C | C | C | C |

TABLE 1-4

|  | Comparative Example 13 | Comparative Example 14 | Comparative Example 15 | Comparative Example 16 | Comparative Example 17 | Comparative Example 18 | Comparative Example 19 |
|---|---|---|---|---|---|---|---|
| Electrolyte Solution | (aa) | (ab) | (ac) | (ag) | (ah) | (ai) | (ak) |
| Perfluoro Compound Kind | — | — | — | (13) | (14) | (15) | (16) |
| Amount (wt %) | — | — | — | 1 | 1 | 5 | 1 |
| Additive Kind | (D) | (E) | — | — | — | — | — |
| Amount (wt %) | 60 | 40 | — | — | — | — | — |
| Heating Temperature (° C.) | 30 | 30 | — | 65 | 70 | 120 | 30 |
| Gelling Power | C | C | C | A | A | A | C |

<Evaluation of an Electrolyte Solution>

For the electrolyte solutions of Examples 1 and 2, Examples 4 and 5, and Comparative Examples 1, 2, 8, 9, 10 and 15, the evaluation described in the above-mentioned "(ii) Measurement of the conductivity of an electrolyte solution" was carried out. The results are shown in Table 2. It is found that the perfluoro compound and the specific additive as well exhibited almost no decrease in the conductivity.

TABLE 2

|  | Example 1 | Example 2 | Example 4 | Example 5 | Comparative Example 1 |
|---|---|---|---|---|---|
| Electrolyte Solution | (a) | (b) | (d) | (e) | (o) |
| Conductivity (S/m) | 0.49 | 0.44 | 0.48 | 0.40 | 0.55 |

TABLE 2-continued

|  | Comparative Example 2 | Comparative Example 8 | Comparative Example 9 | Comparative Example 10 | Comparative Example 15 |
|---|---|---|---|---|---|
| Electrolyte Solution | (p) | (v) | (w) | (x) | (ac) |
| Conductivity (S/m) | 0.54 | 0.50 | 0.48 | 0.47 | 0.59 |

For the electrolyte solutions of Example 1 and Comparative Examples 1, 8 and 15, the evaluation described in the above-mentioned "(iii) Measurement of the diffusion coefficient of an electrolyte solution component" was carried out. The results are shown in Table 3. It is found that the perfluoro compound and the specific additive as well did not decrease the diffusivity and the transport number of lithium.

TABLE 3

|  | Example 1 | Comparative Example 1 | Comparative Example 8 | Comparative Example 15 |
|---|---|---|---|---|
| Electrolyte Solution | (a) | (o) | (v) | (ac) |
| Diffusion Coefficient of $Li^+$ (/E-10) | 1.86 | 1.79 | 2.30 | 1.98 |
| Diffusion Coefficient of Anion (/E-10) | 2.71 | 3.02 | 3.43 | 3.12 |

TABLE 3-continued

|  | Example 1 | Comparative Example 1 | Comparative Example 8 | Comparative Example 15 |
|---|---|---|---|---|
| Li+ Transport Number | 0.41 | 0.7 | 0.40 | 0.39 |

For the electrolyte solutions of Examples 1 to 18 and Comparative Examples 1, 3, 4, 6, 8 and 10 to 19, the evaluation described in the above-mentioned "(iv) Safety test (flammability test) of an electrolyte solution" was carried out. The results are shown in Table 4 (Table 4-1 to Table 4-4). It is found that electrolyte solutions concerned containing the perfluoro compound and the specific additive were more improved in the safety than electrolyte solutions having the same constitution other than the containing.

TABLE 4-1

|  | Example 1 | Example 2 | Example 3 | Example 4 | Example 5 |
|---|---|---|---|---|---|
| Electrolyte Solution | (a) | (b) | (c) | (d) | (e) |
| Elapsed Time (s) | 28.8 | no ignition | no ignition | 22.1 | 37.6 |
| Afterflame Time (s) | 7.65 |  |  | 8.0 | 10.1 |

|  | Example 6 | Example 7 | Example 8 | Example 9 | Example 10 |
|---|---|---|---|---|---|
| Electrolyte Solution | (f) | (g) | (h) | (i) | (j) |
| Elapsed Time (s) | 38.8 | 18.2 | 28.8 | no ignition | 19.2 |
| Afterflame Time (s) | 7.9 | 16.3 | 9.4 |  | 6.0 |

TABLE 4-2

|  | Example 11 | Example 12 | Example 13 | Example 14 | Example 15 | Example 16 |
|---|---|---|---|---|---|---|
| Electrolyte Solution | (k) | (l) | (m) | (n) | (ad) | (ae) |
| Elapsed Time (s) | 46.9 | 50.2 | 72.4 | 22.4 | 30.8 | 28.4 |
| Afterflame Time (s) | 16.1 | 15.3 | 11.0 | 15.0 | 15.2 | 12.1 |

|  | Example 17 | Example 18 | Comparative Example 1 | Comparative Example 3 |
|---|---|---|---|---|
| Electrolyte Solution | (af) | (aj) | (o) | (q) |
| Elapsed Time (s) | 35.9 | 15.6 | 18.0 | 21.1 |
| Afterflame Time (s) | 8.2 | 16.1 | 15.8 | 17.3 |

TABLE 4-3

|  | Comparative Example 4 | Comparative Example 6 | Comparative Example 8 | Comparative Example 10 | Comparative Example 11 |
|---|---|---|---|---|---|
| Electrolyte Solution | (r) | (t) | (v) | (x) | (y) |
| Elapsed Time (s) | 30.5 | 14.0 | 6.9 | 8.1 | 4.5 |
| Afterflame Time (s) | 18.8 | 18.6 | 18.8 | 8.3 | 15.0 |

|  | Comparative Example 12 | Comparative Example 13 | Comparative Example 14 | Comparative Example 15 | Comparative Example 16 |
|---|---|---|---|---|---|
| Electrolyte Solution | (z) | (aa) | (ab) | (ac) | (ag) |
| Elapsed Time (s) | 4.6 | 10.5 | 6.1 | 4.7 | 12.1 |
| Afterflame Time (s) | 16.0 | 14.2 | 16.4 | 15.7 | 19.0 |

TABLE 4-4

|  | Comparative Example 17 | Comparative Example 18 | Comparative Example 19 |
|---|---|---|---|
| Electrolyte Solution | (ah) | (ai) | (ak) |
| Elapsed Time (s) | 18.3 | 17.8 | 10.3 |
| Afterflame Time (s) | 16.1 | 20.2 | 20.1 |

For the electrolyte solutions (c) and (ac) of Example 3 and Comparative Example 15, the evaluation described in the above-mentioned "(v) Liquid retainability test of an electrolyte solution" was carried out. The results are shown in Table 5.

TABLE 5

|  | Example 3 | Comparative Example 15 |
|---|---|---|
| Electrolyte Solution | (c) | (ac) |
| Liquid Leakage Start Pressure (kgf/cm) | 2.0 | <0.2 |
| Liquid Retention Ratio (%) | 100 | 70.1 |

<Fabrication of a Positive Electrode (1)>

Lithium cobaltate ($LiCoO_2$) having a number-average particle diameter of 5 μm as a positive electrode active substance, a graphite carbon powder having a number-average particle diameter of 3 μm as a conductive aid, and a polyvinylidene fluoride (PVdF) as a binder were mixed in a mass ratio of 85:10:5. N-methyl-2-pyrrolidone was charged in the obtained mixture so that the solid content became 60% by mass, and further mixed to prepare a slurry-like solution. The slurry-like solution was applied on one surface of an aluminum foil having a thickness of 20 μm; and after the solvent was dried and removed, the resultant was rolled by a roll press. The resultant after the rolling was punched into a circular disc shape of 16 mm in diameter to obtain a positive electrode (α).

<Fabrication of a Negative Electrode (1)>

A mesocarbon microbead having a number-average particle diameter of 5 μm as a negative electrode active substance, and a dienic rubber (the glass transition temperature: −5° C., the number-average particle diameter at a dry condition: 120 nm, the disperse medium: water, and the solid content concentration: 40% by mass) as a binder were mixed so that the solid content concentration of the negative electrode active substance became 60% by mass while the viscosity of the mixture was being regulated with a carboxymethyl cellulose, to prepare a slurry-like solution. The slurry-like solution was applied on one surface of a copper foil having a thickness of 10 μm; and after the solvent was dried and removed, the resultant was rolled by a roll press. The resultant after the rolling was punched into a circular disk shape of 16 mm in diameter to obtain a negative electrode (β).

<Fabrication of a Positive Electrode (2)>

A mixed oxide having a number-average particle diameter of 11 μm of lithium with nickel, manganese and cobalt as a positive electrode active substance, a graphite carbon powder having a number-average particle diameter of 6.5 μm and an acetylene black powder having a number-average particle diameter of 48 nm as conductive aids, and a polyvinylidene fluoride (PVdF) as a binder were mixed in a mass ratio of 100:4.2:1.8:4.6. N-methyl-2-pyrrolidone was charged in the obtained mixture so that the solid content became 68% by mass, and further mixed to prepare a slurry-like solution. The slurry-like solution was applied on one surface of an aluminum foil having a thickness of 20 μm; and after the solvent was dried and removed, the resultant was rolled by a roll press. The resultant after the rolling was punched into a circular disc shape of 16 mm in diameter to thereby obtain a positive electrode (γ).

<Fabrication of a Negative Electrode (2)>

A graphite carbon powder having a number-average particle diameter of 12.7 μm and a graphite carbon powder having a number-average particle diameter of 6.5 μm as negative electrode active substances, and a carboxymethyl cellulose solution (solid content concentration: 1.83% by mass) and a dienic rubber (the glass transition temperature: −5° C., the number-average particle diameter at a dry condition: 120 nm, the dispersion medium: water, and the solid content concentration: 40% by mass) as binders were mixed in a solid content mass ratio of 90:10:1.44:1.76 so that the whole solid content concentration became 45% by mass, to prepare a slurry-like solution. The slurry-like solution was applied on one surface of a copper foil having a thickness of 10 μm; and after the solvent was dried and removed, the resultant was rolled by a roll press. The resultant after the rolling was punched into a circular disc shape of 16 mm in diameter to thereby obtain a negative electrode (δ).

<Fabrication of a Positive Electrode (3)>

Lithium cobaltate ($LiCoO_2$) as a positive electrode active substance, an acetylene black as a conductive aid, and a polyvinylidene fluoride (PVdF) as a binder were mixed in a mass ratio of 89.5:4.5:6.0. N-methyl-2-pyrrolidone was further mixed to the obtained mixture to prepare a slurry-like solution. The slurry-like solution was applied on an aluminum foil having a thickness of 20 μm and a width of 200 mm; and after the solvent was dried and removed, the resultant was rolled by a roll press, further vacuum dried at 150° C. for 10 hours, and punched into a rectangular shape of 50 mm×30 mm to obtain a positive electrode (ε). The slurry-like solution was prepared by regulating the solvent amount so that the mixture after the vacuum drying in the obtained electrode had a weight basis for one surface of 24.8 $g/cm^2$±3%, a thickness for one surface of 82.6 μm±3%, a density of 3.0 $g/cm^3$±3%, and a coating width of 150 mm to the aluminum foil width of 200 mm.

<Fabrication of a Negative Electrode (3)>

A graphite carbon powder (trade name, "MCMB25-28", Osaka Gas Chemical Co., Ltd.) as a negative electrode active substance, an acetylene black as a conductive aid, and a polyvinylidene fluoride (PVdF) as a binder were mixed in a mass ratio of 93.0:2.0:5.0. N-methyl-2-pyrrolidone was further mixed in the obtained mixture to prepare a slurry-like solution. The slurry-like solution was applied on an aluminum foil having a thickness of 14 μm and a width of 200 mm; and after the solvent was dried and removed, the resultant was rolled by a roll press, further vacuum dried at 150° C. for 10 hours, and punched into 52 mm×32 mm to obtain a negative electrode (ζ). The slurry-like solution was prepared by regulating the solvent amount so that the mixture after the vacuum drying in the obtained electrode had a weight basis for one surface of 11.8 $g/cm^2$±3%, a thickness for one surface of 84.6 μm±3%, a density of 1.4 $g/cm^3$±3%, and a coating width of 150 mm to the aluminum foil width of 200 mm.

Example 19

<Assembling of a Battery>

A laminate, in which the positive electrode (α) and the negative electrode (β) fabricated as described above were overlaid on both sides of a separator (the membrane thickness: 25 μm the porosity: 50%, and the pore diameter: 0.1 μm to 1 μm) composed of a polyethylene, was inserted in a SUS-made circular disk-type battery case. Then, 0.5 mL of the electrolyte solution (a) heated at 70° C. was injected in the battery case to immerse the laminate in the electrolyte solution (a), and thereafter, the battery case was closed to fabricate a lithium ion secondary battery (small-sized battery). The lithium ion secondary battery was held at 70° C. for 1 hour, and then cooled to 25° C. to obtain a battery (a1).

Example 20 to Example 25, and Comparative Examples 20 TO 28 and 43

Each battery shown in Table 6 (Table 6-1, Table 6-3 and Table 6-5) was obtained as in Example 19, except for altering the electrolyte solution (a) and the heating at 70° C. to those shown in Table 6.

Example 26

A battery (a2) was obtained as in Example 19, except for altering the positive electrode (α) and the negative electrode (β) to the positive electrode (γ) and the negative electrode (δ).

Example 27 to Example 37, and Comparative Examples 29 to 41

Each battery shown in Table 6 (Table 6-1 to Table 6-5) was obtained as in Example 26, except for altering the electrolyte solution (a) and the heating at 70° C. to those shown in Table 6.

Example 38

<Assembling of a Battery>

Two sheets of a laminate film (no drawing, the thickness: 120 μm, 68 mm×48 mm) obtained by laminating an aluminum layer and a resin layer were overlapped with the aluminum layers outside, and three sides thereof were sealed to fabricate a laminate cell armor. Then, as a separator, a polyethylene-made microporous membrane (the membrane thickness: 20 μm, 53 mm×33 mm) was prepared; and a laminate in which pluralities of the positive electrode (ε) and the negative electrode (ζ) fabricated as described above were alternately overlapped through the separator was arranged in the laminate cell armor. Then, the electrolyte solution (c) heated at 75° C. was injected in the cell armor to immerse the laminate in the electrolyte solution. The injection of the electrolyte solution (c) was carried out by repeating the atmospheric pressure and the reduced pressure of 100 mmHg until there was no generation of bubbles. The remaining one side of the laminate cell armor was sealed under the environment of reduced pressure of 100 mmHg to obtain a lithium ion secondary battery. The obtained battery was held at 75° C. for 2.5 hours, and thereafter cooled to 25° C. to obtain a battery (c3).

Comparative Example 42

A battery (ac3) was obtained as in Example 33, except for using the electrolyte solution (ac) in place of the electrolyte solution (c).

TABLE 6-1

| | Example 19 | Example 20 | Example 21 | Example 22 | Example 23 | Example 24 | Example 25 | Example 26 | Example 27 | Example 28 |
|---|---|---|---|---|---|---|---|---|---|---|
| Battery | (a1) | (b1) | (d1) | (e1) | (ae1) | (af1) | (aj1) | (e2) | (c2) | (d2) |
| Electrolyte Solution | (a) | (b) | (d) | (e) | (ae) | (af) | (aj) | (a) | (c) | (d) |

TABLE 6-1-continued

|  | Example 19 | Example 20 | Example 21 | Example 22 | Example 23 | Example 24 | Example 25 | Example 26 | Example 27 | Example 28 |
|---|---|---|---|---|---|---|---|---|---|---|
| Electrodes (Positive Electrode/ Negative Electrode) | (α)/(β) | (α)/(β) | (α)/(β) | (α)/(β) | (α)/(β) | (α)/(β) | (α)/(β) | (γ)/(δ) | (γ)/(δ) | (γ)/(δ) |
| Heating Temperature (° C.) | 70 | 70 | 70 | 70 | 70 | 110 | 30 | 70 | 75 | 70 |

TABLE 6-2

|  | Example 29 | Example 30 | Example 31 | Example 32 | Example 33 | Example 34 | Example 35 | Example 36 | Example 37 | Example 38 |
|---|---|---|---|---|---|---|---|---|---|---|
| Battery Electrolyte Solution | (f2) (f) | (g2) (g) | (h2) (h) | (i2) (i) | (j2) (j) | (k2) (k) | (l2) (l) | (m2) (m) | (ad2) (ad) | (c3) (c) |
| Electrodes (Positive Electrode/ Negative Electrode) | (γ)/(δ) | (γ)/(δ) | (γ)/(δ) | (γ)/(δ) | (γ)/(δ) | (γ)/(δ) | (γ)/(δ) | (γ)/(δ) | (γ)/(δ) | (ε)/(ξ) |
| Heating Temperature (° C.) | 90 | 75 | 80 | 85 | 80 | 75 | 75 | 80 | 70 | 75 |

TABLE 6-3

|  | Comparative Example 20 | Comparative Example 21 | Comparative Example 22 | Comparative Example 23 | Comparative Example 24 |
|---|---|---|---|---|---|
| Battery Electrolyte Solution | (o1) (o) | (p1) (p) | (q1) (q) | (v1) (v) | (w1) (w) |
| Electrodes (Positive Electrode/ Negative Electrode) | (α)/(β) | (α)/(β) | (α)/(β) | (α)/(β) | (α)/(β) |
| Heating Temperature (° C.) | 70 | 75 | 70 | 30 | 30 |

|  | Comparative Example 25 | Comparative Example 26 | Comparative Example 27 | Comparative Example 28 | Comparative Example 29 |
|---|---|---|---|---|---|
| Battery Electrolyte Solution | (x1) (x) | (ac1) (ac) | (ah1) (ah) | (ai1) (ai) | (o2) (o) |
| Electrodes (Positive Electrode/ Negative Electrode) | (α)/(β) | (α)/(β) | (α)/(β) | (α)/(β) | (γ)/(δ) |
| Heating Temperature (° C.) | 30 | — | 70 | 120 | 70 |

TABLE 6-4

|  | Comparative Example 30 | Comparative Example 31 | Comparative Example 32 | Comparative Example 33 | Comparative Example 34 |
|---|---|---|---|---|---|
| Battery Electrolyte Solution | (r2) (r) | (s2) (s) | (t2) (t) | (u2) (u) | (v2) (v) |
| Electrodes (Positive Electrode/ Negative Electrode) | (γ)/(δ) | (γ)/(δ) | (γ)/(δ) | (γ)/(δ) | (γ)/(δ) |
| Heating Temperature (° C.) | 90 | 75 | 80 | 85 | 30 |

|  | Comparative Example 35 | Comparative Example 36 | Comparative Example 37 | Comparative Example 38 | Comparative Example 39 |
|---|---|---|---|---|---|
| Battery Electrolyte Solution | (x2) (x) | (y2) (y) | (z2) (z) | (aa2) (aa) | (ab2) (ab) |
| Electrodes (Positive Electrode/ Negative Electrode) | (γ)/(δ) | (γ)/(δ) | (γ)/(δ) | (γ)/(δ) | (γ)/(δ) |
| Heating Temperature (° C.) | 30 | 30 | 30 | 30 | 30 |

TABLE 6-5

|  | Comparative Example 40 | Comparative Example 41 | Comparative Example 42 | Comparative Example 43 |
|---|---|---|---|---|
| Battery Electrolyte Solution | (ac2) (ac) | (ag2) (ag) | (ac3) (ε)/(ξ) | (ak1) (ak) |
| Electrodes (Positive Electrode/ Negative Electrode) | (γ)/(δ) | (γ)/(δ) | (ac) | (α)/(β) |
| Heating Temperature (° C.) | — | 70 | — | 30 |

For the batteries of Examples 19 to 38 and Comparative Examples 20 to 41 and 43, the measurements described in the above-mentioned "(v) Measurement of the discharge capacity of a lithium ion secondary battery" and "(viii) Measurement of the capacity retention rate (cycle test) of a lithium ion secondary battery" were carried out. The results are shown in Table 7 (Table 7-1 to Table 7-5). It is found that batteries concerned having an electrolyte solution containing the perfluoro compound and the specific additive according to the present invention exhibited better battery characteristics than batteries having the same constitution other than the containing.

TABLE 7-1

|  | Example 19 | Example 20 | Example 21 | Example 22 | Example 23 | Example 24 | Example 25 | Example 26 | Example 27 | Example 28 |
|---|---|---|---|---|---|---|---|---|---|---|
| Battery | (a1) | (b1) | (d1) | (e1) | (ae1) | (af1) | (aj1) | (a2) | (c2) | (d2) |
| Discharge Capacity (mAh) 6 mA | 6.74 | 6.58 | 5.04 | 6.73 | 6.66 | 5.31 | 6.71 | 6.02 | 6.01 | 5.26 |
| Discharge Capacity (mAh) 18 mA | 2.52 | 1.68 | 1.85 | 2.53 | 2.01 | 1.79 | 2.44 | 2.24 | 2.26 | 1.75 |
| Capacity Retention Rate (%) | 96.5 | 75.8 | 88.1 | 95.2 | 90.9 | 74.0 | 97.9 | 84.7 | 85.5 | 56.7 |

TABLE 7-2

|  | Example 29 | Example 30 | Example 31 | Example 32 | Example 33 | Example 34 | Example 35 | Example 36 | Example 37 | Example 38 |
|---|---|---|---|---|---|---|---|---|---|---|
| Battery | (f2) | (g2) | (h2) | (i2) | (j2) | (k2) | (l2) | (m2) | (ad2) | (c3) |
| Discharge Capacity (mAh) 6 mA | 6.14 | 6.06 | 5.67 | 5.34 | 5.18 | 4.97 | 5.21 | 2.03 | 5.22 | 3.11 |
| Discharge Capacity (mAh) 18 mA | 2.09 | 2.16 | 2.35 | 3.11 | 2.09 | 1.08 | 1.41 | 0.21 | 3.00 | 1.11 |
| Capacity Retention Rate (%) | 89.6 | 86.2 | 75.8 | 92.4 | 62.2 | 51.5 | 94.7 | 80.5 | 87.6 | 54.2 |

TABLE 7-3

|  | Comparative Example 20 | Comparative Example 21 | Comparative Example 22 | Comparative Example 23 | Comparative Example 24 |
|---|---|---|---|---|---|
| Battery | (o1) | (p1) | (q1) | (v1) | (w1) |
| Discharge Capacity (mAh) 6 mA | 6.77 | 6.57 | 6.45 | 6.73 | 6.13 |
| Discharge Capacity (mAh) 18 mA | 2.01 | 1.89 | 2.00 | 1.83 | 1.23 |
| Capacity Retention Rate (%) | 95.5 | 94.9 | 90.6 | 90.0 | * |

|  | Comparative Example 25 | Comparative Example 26 | Comparative Example 27 | Comparative Example 28 | Comparative Example 29 |
|---|---|---|---|---|---|
| Battery | (x1) | (ac1) | (ah1) | (ai1) | (o2) |
| Discharge Capacity (mAh) 6 mA | 4.76 | 6.80 | 6.78 | 5.22 | 5.82 |
| Discharge Capacity (mAh) 18 mA | 1.26 | 2.14 | 2.11 | 1.89 | 2.78 |
| Capacity Retention Rate (%) | 85.3 | 93.7 | 90.8 | 73.8 | 96.9 |

* The battery deterioration was severe and the evaluation could not be carried out to the end.

TABLE 7-4

|  | Comparative Example 30 | Comparative Example 31 | Comparative Example 32 | Comparative Example 33 | Comparative Example 34 |
|---|---|---|---|---|---|
| Battery | (r2) | (s2) | (t2) | (u2) | (v2) |
| Discharge Capacity (mAh) 6 mA | 5.87 | 6.01 | 6.25 | 5.73 | 6.00 |
| Discharge Capacity (mAh) 18 mA | 2.92 | 2.98 | 3.12 | 2.96 | 2.31 |

TABLE 7-4-continued

| | | | | | |
|---|---|---|---|---|---|
| Capacity Retention Rate (%) | 85.3 | 88.8 | 97.7 | 97.2 | 80.9 |

| | Comparative Example 35 | Comparative Example 36 | Comparative Example 37 | Comparative Example 38 | Comparative Example 39 |
|---|---|---|---|---|---|
| Battery | (x2) | (y2) | (z2) | (aa2) | (ab2) |
| Discharge 6 mA | 4.01 | 2.29 | 4.79 | 1.42 | Unable to charge |
| Capacity 18 mA (mAh) | 0.77 | 0.86 | 0.36 | 0.15 | |
| Capacity Retention Rate (%) | 3.80 | 22.4 | 98.9 | 76.6 | |

TABLE 7-5

| | Comparative Example 40 | Comparative Example 41 | Comparative Example 43 |
|---|---|---|---|
| Battery | (ac2) | (ag2) | (ak1) |
| Discharge 6 mA | 5.26 | 6.60 | 6.77 |
| Capacity 18 mA (mAh) | 3.06 | 2.97 | 2.30 |
| Capacity Retention Rate (%) | 95.4 | 88.8 | 95.2 |

For the batteries (c3) of Example 38 and (ac3) of Comparative Example 42, the test described in the above-mentioned "(x) Test of lithium electrodeposition of a lithium ion secondary battery" was carried out. The results are shown in Table 8. The battery (c3) exhibited suppressed electrodeposition, and was a battery improved in the safety.

TABLE 8

| | Example 38 | Comparative Example 42 |
|---|---|---|
| Battery | (c3) | (ac3) |
| Lithium Electrodeposition State | B | C |

For the batteries (c3) of Example 38 and (ac3) of Comparative Example 42, the measurement described in the above-mentioned "(vi) Measurement of the discharge capacity of a laminate-type lithium ion secondary battery" was carried out. The results are shown in Table 9.

TABLE 9

| | Example 38 | Comparative Example 42 |
|---|---|---|
| Battery | (c3) | (ac3) |
| Discharge Capacity (mAh) | 46.36 | 46.37 |

REFERENCE SIGNS LIST

100 . . . . Lithium ion secondary battery, 110 . . . . Separator, 120 . . . . Positive electrode, 130 . . . . Negative electrode, 140 . . . . Positive electrode current collector, 150 . . . . Negative electrode current collector, 160 . . . . Battery armor.

The invention claimed is:

1. An electrolyte solution comprising a nonaqueous solvent, an electrolyte, a compound represented by formula (1) and/or (2) shown below, and an additive having a fluorine atom and/or a phosphorus atom in the molecule:

$$Rf^1\text{-}R^1\text{—}X^1\text{-}L^1\text{-}R^2 \qquad (1)$$

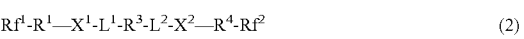

$$Rf^1\text{-}R^1\text{—}X^1\text{-}L^1\text{-}R^3\text{-}L^2\text{-}X^2\text{—}R^4\text{-}Rf^2 \qquad (2)$$

wherein in the formula (1) and the formula (2),
each of $Rf^1$ and $Rf^2$ independently represents a perfluoroalkyl group having 2 to 20 carbon atoms;
each of $R^1$ and $R^4$ independently represents a divalent saturated hydrocarbon group having 1 to 6 carbon atoms;
each of $X^1$ and $X^2$ independently represents a divalent functional group selected from the group consisting of an ether group, a sulfide group, a sulfoxide group, a sulfone group, an ester group, a divalent amido group, and a divalent urethane group;
each of $L^1$ and $L^2$ independently represents an oxycycloalkylene group which may be substituted with an alkyl group or a halogen atom, or a divalent oxyaromatic group which may be substituted with an alkyl group or a halogen atom;
$R^2$ represents an alkyl group having 1 to 20 carbon atoms which may be substituted with an alkyl group or a halogen atom (excluding a fluorine atom), a fluoroalkyl group which may be substituted with an alkyl group or a halogen atom (excluding a fluorine atom), an aryl group or a fluoroaryl group, or a monovalent group in which one or more of the alkyl, fluoroalkyl, aryl and fluoroaryl groups are bonded with one or more of divalent groups corresponding to the alkyl, fluoroalkyl, aryl, or fluoroaryl groups; and
$R^3$ represents a divalent saturated hydrocarbon group having 1 to 18 carbon atoms which may have one or more oxygen and/or sulfur atoms on the main chain and which may be substituted with an alkyl group.

2. The electrolyte solution according to claim 1, wherein each of the $Rf^1$ and the $Rf^2$ is independently a perfluoroalkyl group having 2 to 12 carbon atoms.

3. The electrolyte solution according to claim 1, wherein each of the $L^1$ and the $L^2$ is independently a divalent oxyaromatic group.

4. The electrolyte solution according to claim 1, wherein each of the $X^1$ and the $X^2$ is independently a sulfone group or an ether group.

5. The electrolyte solution according to claim 1, wherein the $X^1$ and the $X^2$ are a sulfone group.

6. The electrolyte solution according to claim 1, wherein the additive having a fluorine atom and/or a phosphorus atom in the molecule is one or more selected from the group consisting of phosphoric acid compounds, reducing phosphorus compounds, fluorine-substituted alkyl ethers, fluorine-containing amides, fluorine-substituted hydrocarbons, fluorine-containing esters, fluorine-containing carbonates, fluorine-containing phosphate (phosphite) esters, fluorine-containing phosphate (phosphite) salts, fluorine-containing polymers, and phosphazene compounds.

7. The electrolyte solution according to claim 1, wherein the additive having a fluorine atom and/or a phosphorus atom in the molecule is an additive having an amount of fluorine atoms satisfying the condition represented by the following expression (18):

$$(N_F)/(N_F+N_H) \geq 0.5 \qquad (18)$$

wherein $N_F$ indicates the number of fluorine atoms per molecule of the additive having a fluorine atom and/or a phosphorus atom in the molecule; and $N_H$ indicates the number of hydrogen atoms per molecule of the additive having a fluorine atom and/or a phosphorus atom in the molecule.

8. The electrolyte solution according to claim 1, wherein the additive having a fluorine atom and/or a phosphorus atom in the molecule is one or more selected from the group consisting of reducing phosphorus compounds, fluorine-substituted alkyl ethers, fluorine-containing amides, and phosphazene compounds.

9. The electrolyte solution according to claim 1, wherein the additive having a fluorine atom and/or a phosphorus atom in the molecule is a reducing phosphorus compound.

10. The electrolyte solution according to claim 1, wherein the additive having a fluorine atom and/or a phosphorus atom in the molecule is a compound having a fluorine atom and a phosphorus atom in the molecule.

11. The electrolyte solution according to claim 1, wherein the electrolyte is a lithium salt.

12. The electrolyte solution according to claim 1, wherein the electrolyte solution is a gelatinized electrolyte solution.

13. A lithium ion secondary battery comprising:
an electrolyte solution according to claim 1;
a positive electrode comprising one or more materials selected from the group consisting of materials capable of doping and dedoping lithium ions, as a positive electrode active substance; and
a negative electrode comprising one or more materials selected from the group consisting of materials capable of doping and dedoping lithium ions and metallic lithium, as a negative electrode active substance.

14. The lithium ion secondary battery according to claim 13, wherein the positive electrode comprises a lithium-containing compound as the positive electrode active substance.

15. The lithium ion secondary battery according to claim 13, wherein the negative electrode comprises one or more materials selected from the group consisting of metallic lithium, carbon materials, materials containing an element capable of forming an alloy with lithium, and lithium-containing compounds, as the negative electrode active substance.

16. The electrolyte solution according to claim 2, wherein each of the $X^1$ and the $X^2$ is independently a sulfone group or an ether group.

17. The electrolyte solution according to claim 2, wherein the additive having a fluorine atom and/or a phosphorus atom in the molecule is an additive having an amount of fluorine atoms satisfying the condition represented by the following expression (18):

$$(N_F)/(N_F+N_H) \geq 0.5 \qquad (18)$$

wherein $N_F$ indicates the number of fluorine atoms per molecule of the additive having a fluorine atom and/or a phosphorus atom in the molecule; and $N_H$ indicates the number of hydrogen atoms per molecule of the additive having a fluorine atom and/or a phosphorus atom in the molecule.

18. The electrolyte solution according to claim 16, wherein the additive having a fluorine atom and/or a phosphorus atom in the molecule is one or more selected from the group consisting of reducing phosphorus compounds, fluorine-substituted alkyl ethers, fluorine-containing amides, and phosphazene compounds.

19. The electrolyte solution according to claim 16, wherein the additive having a fluorine atom and/or a phosphorus atom in the molecule is a reducing phosphorus compound.

20. A lithium ion secondary battery comprising:
an electrolyte solution according to claim 16;
a positive electrode comprising one or more materials selected from the group consisting of materials capable of doping and dedoping lithium ions, as a positive electrode active substance; and
a negative electrode comprising one or more materials selected from the group consisting of materials capable of doping and dedoping lithium ions and metallic lithium, as a negative electrode active substance.

21. A lithium ion secondary battery comprising:
an electrolyte solution according to claim 18;
a positive electrode comprising one or more materials selected from the group consisting of materials capable of doping and dedoping lithium ions, as a positive electrode active substance; and
a negative electrode comprising one or more materials selected from the group consisting of materials capable of doping and dedoping lithium ions and metallic lithium, as a negative electrode active substance.

* * * * *